US007021271B2

(12) United States Patent
Kitamura et al.

(10) Patent No.: US 7,021,271 B2
(45) Date of Patent: Apr. 4, 2006

(54) BELT DRIVE SYSTEM

(75) Inventors: Yutaka Kitamura, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 20 days.

(21) Appl. No.: 10/422,908

(22) Filed: Apr. 25, 2003

(65) Prior Publication Data

US 2003/0221656 A1 Dec. 4, 2003

(30) Foreign Application Priority Data

May 28, 2002 (JP) .......................... P2002-153238

(51) Int. Cl.
*F02B 77/00* (2006.01)

(52) U.S. Cl. ................................. 123/198 R; 474/135

(58) Field of Classification Search ............ 123/198 R; 474/135

See application file for complete search history.

(56) References Cited

U.S. PATENT DOCUMENTS 3,786,696 A * 1/1974 Aleem ........................ 475/77
5,132,604 A * 7/1992 Shimane et al. .............. 322/10
5,780,731 A * 7/1998 Matsui et al. .............. 73/118.1
6,506,137 B1 * 1/2003 Guhr .......................... 474/135
6,630,760 B1 * 10/2003 Fulton et al. ............ 310/75 R

FOREIGN PATENT DOCUMENTS

JP 3129268 B 11/2000
JP 2001-59555 A 3/2001

* cited by examiner

*Primary Examiner*—Thomas Denion
*Assistant Examiner*—Zelalem Eshete
(74) *Attorney, Agent, or Firm*—Sughrue Mion, PLLC

(57) ABSTRACT

A belt drive system can appropriately transmit power of an electric rotating machine without setting initial belt tension to be large. In the belt drive system, a stationary tension pulley 18 is located on the side opposite to a crank pulley with respect to an electric rotating machine pulley 13 so that contact angle of a belt that is wrapped around the electric rotating machine pulley 13 in contact therewith may be in a range of 130° to 230°; an idle pulley 17*a* of a first stopper-equipped auto-tensioner 17 is located between the electric rotating machine pulley 13 and an internal combustion engine crank pulley 2; and position of the idle pulley 17*a* is fixed at the time of starting an internal combustion engine; while the idle pulley 17*a* coming to be movable at the time of driving the electric rotating machine as a generator.

19 Claims, 17 Drawing Sheets

BELT DRIVE SYSTEM

BACKGROUND OF THE INVENTION

1. Field of the Invention

The present invention relates to a belt drive system that transmits a rotational power with the use of a belt at the time of starting an engine and at the time of driving an auxiliary machine by means of the engine.

2. Description of the Related Art

As a first prior art of this type, the Japanese Patent Publication (unexamined) No. 14145/1996 discloses a belt drive system in which a crank pulley mounted on a crankshaft of an engine, pulleys respectively mounted on each of auxiliary machines located around the engine, and a pulley mounted on a starting motor are connected through a belt, and the engine is started through the belt by the starting motor as well as each auxiliary machine is driven through the belt by the engine after the engine has been started.

However, since a large transmission torque is required when the engine is started through the belt by the starting motor, it is necessary to apply a high initial tension to the belt. Consequently, a problem exits in that this application of the high initial tension is disadvantageous in the aspect of durability of the belt.

In addition, in the ordinary belt drive system, a crank pulley mounted on a crankshaft of an engine and pulleys mounted on respectively each auxiliary machine are connected through a belt, as well as the crankshaft is driven directly via a gear by a starter when starting the engine, and each auxiliary machine is driven through the belt by the engine after the engine has been started. In such an ordinary belt drive system, it has been known to dispose or insert a first auto-tensioner 20 on the slack side of the belt of the crank pulley 2 in order to reduce initial tension of the belt, as shown in FIG. 12.

However, in the case where the starting motor and the other auxiliary machines are connected through the same belt, position of the tight side and that of the slack side in the belt vary depending on whether it is the time of starting the engine by means of the starting motor (electric rotating machine) or the time of driving the auxiliary machine by means of the engine. Therefore, a method of simply inserting the first auto-tensioner on the belt slack side at the time of driving the auxiliary machines cannot meet the requirements. For example, in the case where the first auto-tensioner is inserted on the slackest side of the belt at the time of driving the auxiliary machines, the first auto-tensioner will be positioned on the belt tight side at the time of starting the engine, resulting in no function as an auto-tensioner.

Furthermore, when operation is switched from driving the engine by means of the starting motor to driving the auxiliary machines by means of the engine, it occurs that the crank pulley begins to rotate, in which rotation of the crank pulley is superior to that of the pulley of the starting motor. Under such situation, a large tension, which has been applied to the belt up to that moment, is sharply reduced to substantially zero, and the belt suffers from being slipped due to the pulley of the starting motor. As a result, another problem exists in that the belt is worn away as well as noise accompanied by the slip is generated. In this connection, to prevent slippage, it may be an idea to pull the pulley under the sate that the belt is wrapped around and increase an initial tension of the belt. To transmit torque at the time of start-up, however, it is necessary to apply an extraordinary large tension. In this case, when such a large belt tension is applied to the pulleys mounted on the other auxiliary machines, it becomes necessary to increase durability or strength of shaft, bearing and other support structure of the auxiliary machine. This results in a further problem of larger size and higher cost of the auxiliary machines.

As a second prior art, the Japanese Patent No. 3129268 discloses a belt drive system as shown in FIG. 13. In this belt drive system, a second auto-tensioner 21 is located on the belt slackest side where slack produced on the belt becomes the largest at the time of starting the engine by means of the starting motor. With this second auto-tensioner 21, a predetermined belt tension is maintained, and it becomes possible to obtain a tension required for transmitting a starting torque on the belt tight side (between the staring motor pulley 13 and the crank pulley 2) at the time of starting an engine. Further, the crank pulley 2 is disposed on the belt tightest side where the tension produced in the belt 7 becomes the largest. Furthermore, the other auxiliary machines are disposed on the tight side of the belt between the crank pulley 2 of the engine and the second auto-tensioner 21 for driving the other auxiliary machines by means of the engine, thereby enabling to prevent the rotary shaft and bearing of the other auxiliary machine from being applied with the maximum belt tension at the time of starting the engine.

However, since rotational power generation source is changed from the starting motor to the engine depending on whether it is the time for starting the engine or the time for driving the auxiliary machines, positions of the tight side and the slack side of the belt 7 relative to the rotational power generation source are changed following the change in rotational power generation source. Thus, a belt tension is most reduced between the crank pulley 2 mounted on the crankshaft and the starting motor pulley 13, and eventually it is possible that a belt slippage occurs at the crank pulley 2 or the starting motor pulley 13.

As countermeasures to the above-mentioned belt slippage, it may be an idea to set the tension of the above-mentioned second auto-tensioner larger. In this case, however, since durability of the belt 7 is remarkably reduced, it is difficult to augment a set tension to a degree of being capable of preventing the belt slippage. Moreover, for the above-mentioned reasons, it is also difficult to preliminarily set an initial tension of the second auto-tensioner 21 to be large taking into consideration slack of the belt 7 due to change with the passage of time or the like.

Further, as a third prior art, the Japanese Patent Publication (unexamined) No. 59555/2001 discloses a belt drive system as shown in FIG. 14. In this belt drive system, the idle pulley 17*a* of the first stopper-equipped auto-tensioner 17 that is capable of adjusting a belt tension is located between the crank pulley 2 of the engine and the starting motor pulley 13. This prior art is constituted such that position of the idle pulley 17*a* is stationary at the time of staring the engine by means of the starting motor, while the idle pulley 17*a* coming to be movable at the time of driving the other auxiliary machine by means of the engine. Thus, position of the idle pulley 17*a* of the first stopper-equipped auto-tensioner 17 is stationary when starting the engine thereby enabling to maintain an initial tension of the belt with the second auto-tensioner 21. Further, the idle pulley 17*a* of the first stopper-equipped auto-tensioner comes to be movable at the time of driving the auxiliary machines, thereby enabling to obtain a function as an auto-tensioner.

However, since the second auto-tensioner 21 is positioned on the belt tight side with respect to the staring motor pulley 13 at the time of driving the auxiliary machines, a difference in tension required for driving between the belt tight side and the belt slack side is definitely essential in order to drive the starting motor.

In particular, in the case where the starting motor functions as a generator or in the case where the auxiliary machines are connected in series to the back side of the staring motor and function as a large load at the time of driving the auxiliary machines, the above-mentioned difference in tension comes to be large.

In this case, on the belt slackest side of the crank pulley 2, a tension value of the second auto-tensioner 21 has to be set larger than a necessary set tension value of the first stopper-equipped auto-tensioner 17 to prevent slippage at the crank pulley portion just by a difference in tension required for driving the mentioned starting motor.

Generally, in the case where a plurality of auto-tensioners are provided on one belt, an initial tension of the belt is to be converged with a tension value of the auto-tensioner of which set tension value is the largest among those plural auto-tensioners. Therefore, in the belt electromotive system as shown in FIG. 14, a set tension value of the mentioned second auto-tensioner 21 becomes larger than a set tension value of the first stopper-equipped auto-tensioner 17 by a tension difference required for driving, e.g., the starting motor, eventually resulting in a problem that the belt initial tension cannot be reduced.

Since the above-mentioned conventional system is constituted as described above, it is necessary to set the belt initial tension to be large in order to prevent the belt from occurrence of slippage both at the time of starting an engine and at the time of driving auxiliary machines. As a result, increase in durability or strength of the shaft, bearing and other support structure of the auxiliary machine is essential, eventually resulting in occurrence of a problem of growing in size, increase in weight and cost.

SUMMARY OF THE INVENTION

The present invention has been made to solve the above-mentioned problems, and has an object of providing a belt drive system capable of appropriately transmitting power between an electric rotating machine, an auxiliary machine and an internal combustion engine without setting any initial tension of belt to be large.

To accomplish the foregoing object, a belt drive system according to a first preferred embodiment includes: an electric rotating machine operating as an electric motor or a generator; electric rotating machine switching control means for switching the mentioned electric rotating machine to the electric motor or to the generator; an electric rotating machine pulley that is mounted on a rotary shaft of the mentioned electric rotating machine; an auxiliary machine pulley that is connected to a rotary shaft of the auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley. In the mentioned belt drive system, a stationary tension pulley is located on the side opposite to the crank pulley with respect to the mentioned electric rotating machine pulley so that contact angle of the belt wrapped around the mentioned electric rotating machine pulley in contact therewith may be in a range of not less than 130° and not more than 230°; an idle pulley of a first stopper-equipped auto-tensioner is located between the mentioned electric rotating machine pulley and the mentioned internal combustion engine crank pulley; and position of the mentioned idle pulley is fixed (stationary) at the time of starting the mentioned internal combustion engine by means of the mentioned electric rotating machine, while the mentioned idle pulley coming to be movable at the time of driving the mentioned electric rotating machine as a generator by means of the mentioned internal combustion engine.

As a result, the belt drive system capable of appropriately transmitting power between the electric rotating machine, the auxiliary machine and the internal combustion engine can be obtained without setting any belt initial tension to be large.

The foregoing and other object, features, aspects and advantages of the present invention will become more apparent the following detailed description of the present invention when taken in conjunction with the accompanying drawings.

DETAILED DESCRIPTION OF THE INVENTION

Embodiment 1

Figure 1:
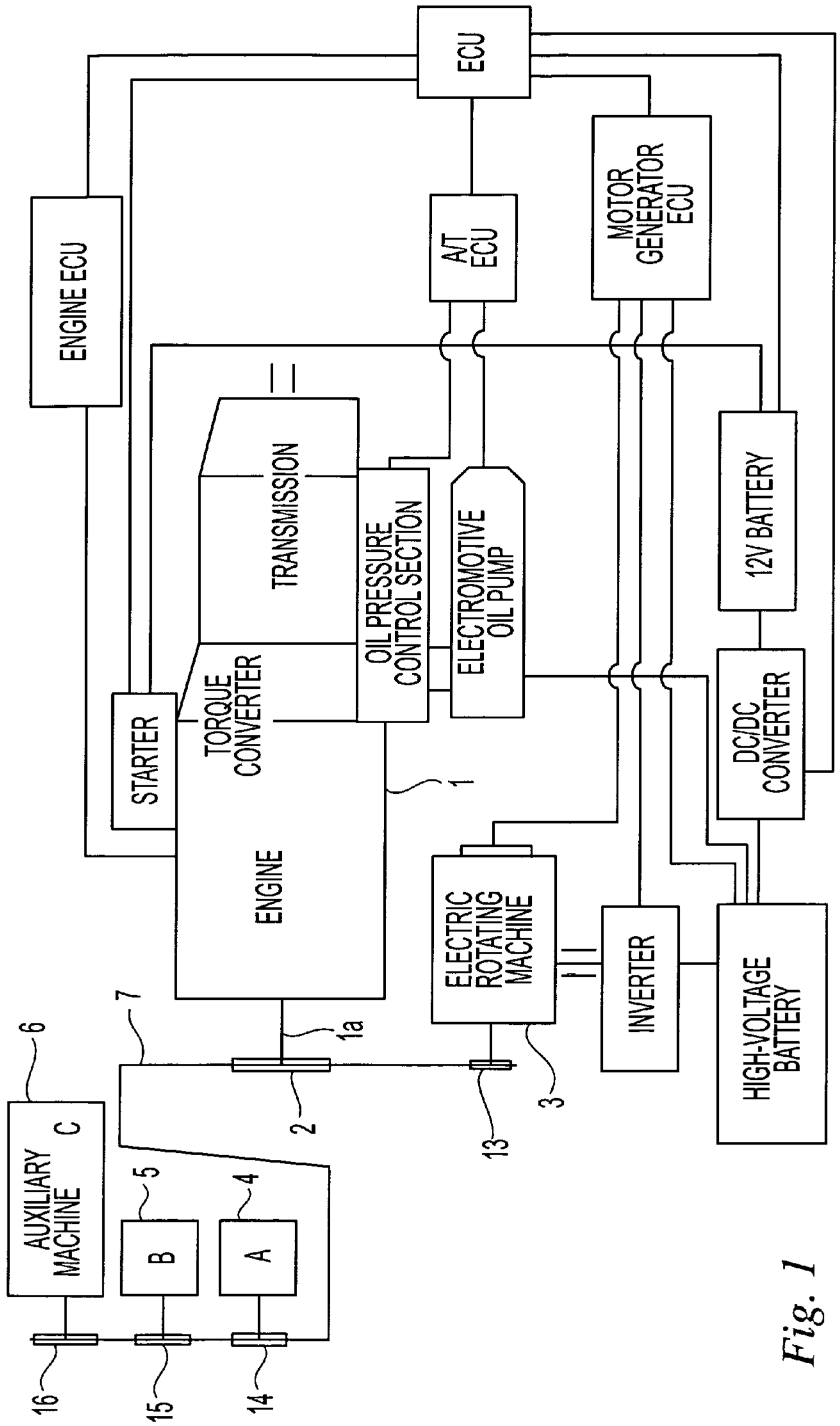
FIG. 1 is a block diagram showing a system constitution of peripheral devices of an engine including a belt drive system according to a first preferred embodiment of the present invention.
Figure 2:
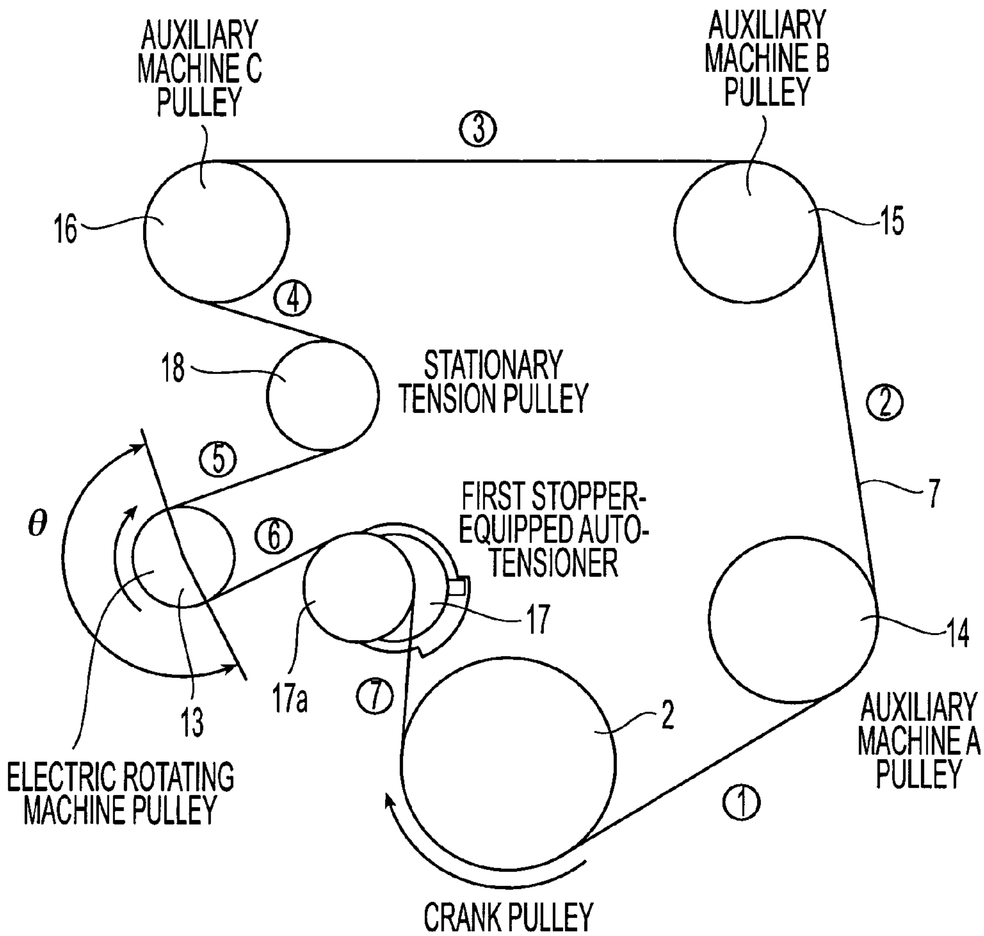
FIG. 2 is a layout diagram showing a constitution of the belt drive system according to the first embodiment of the invention.
Figure 3:
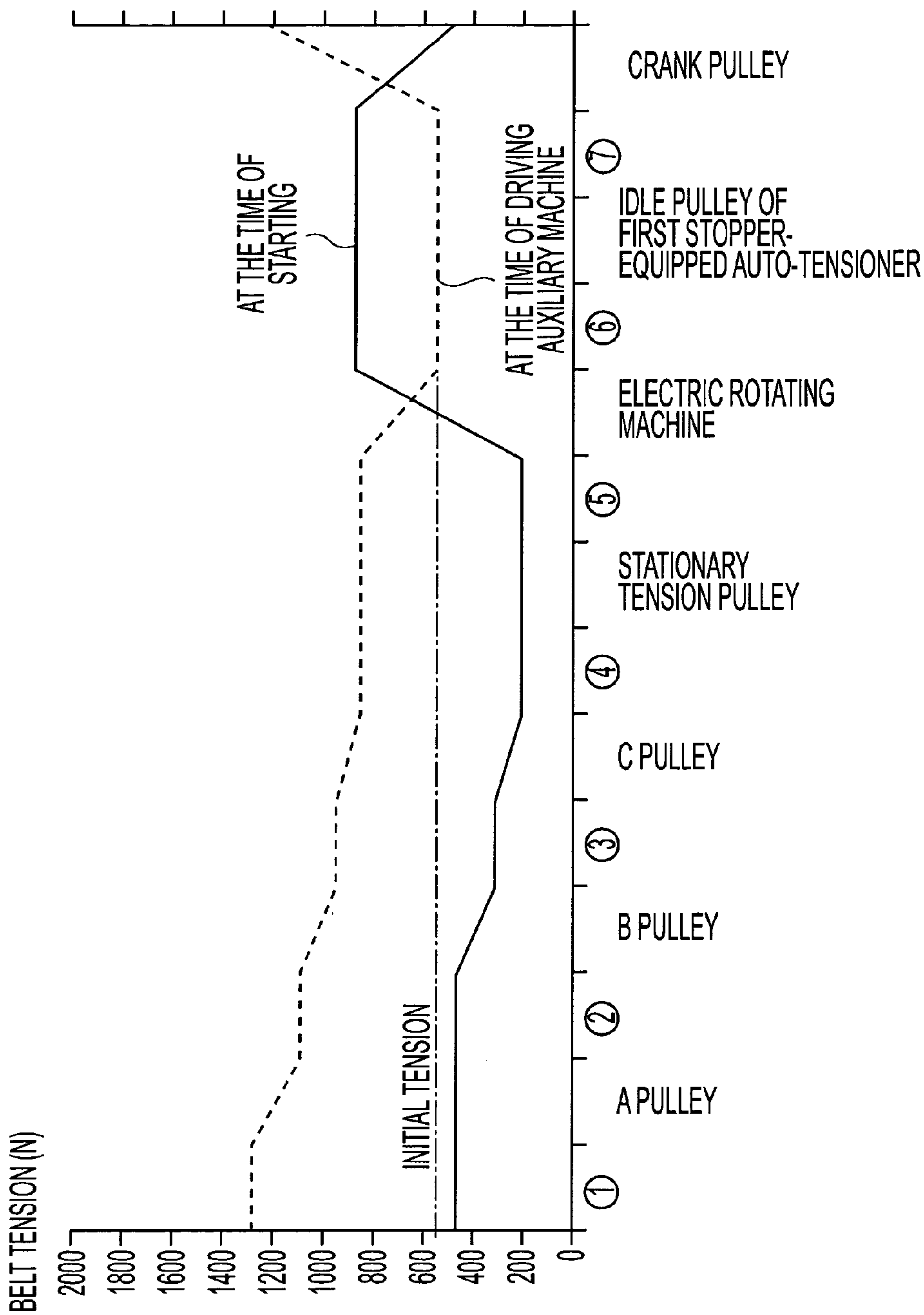
FIG. 3 is a characteristic chart showing changes in belt tension at each pulley and at each portion between the pulleys according to the first embodiment of the invention.
Figure 4:
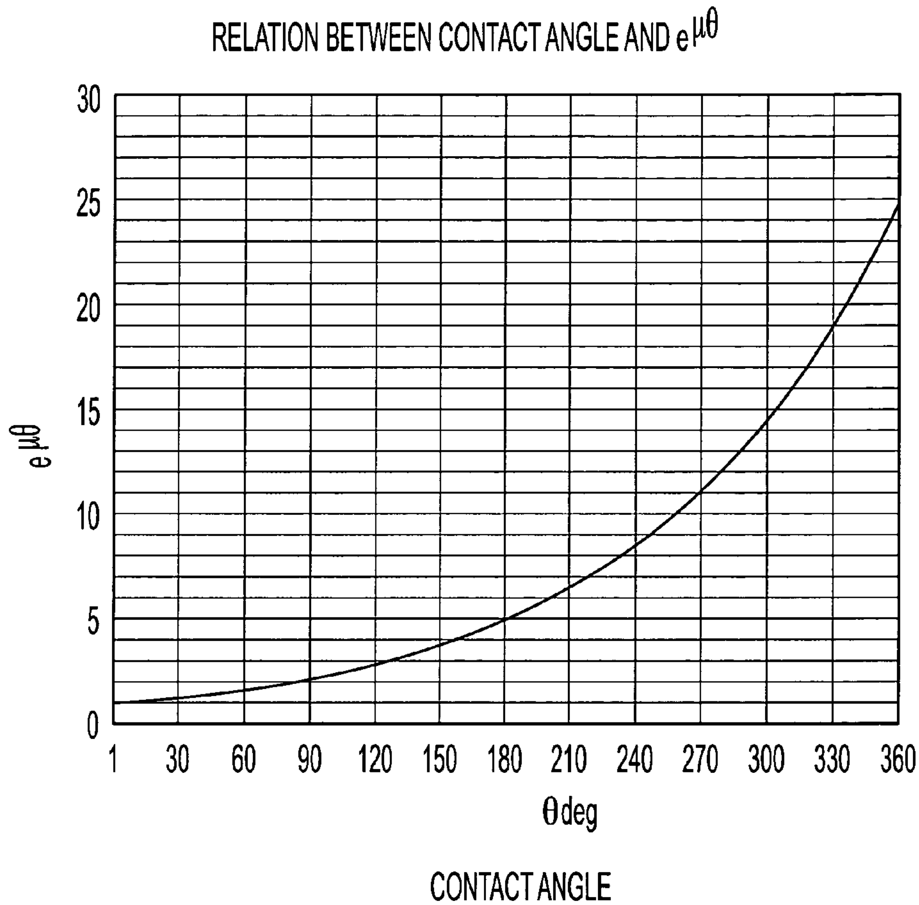
FIG. 4 is a characteristic diagram showing relation between contact angle of the belt being wrapped around the pulley and $e^{\mu\theta}$.

A first preferred embodiment according to the present invention is hereinafter described with reference to FIGS. 1 to 4. FIG. 1 is a block diagram showing a system constitution of peripheral devices of an engine including a belt drive system according to this invention, and FIG. 2 is a layout diagram showing a constitution of the belt drive system according to the first embodiment. FIG. 3 is a characteristic chart showing changes in belt tension at each pulley and at each portion between the pulleys in FIG. 2, and FIG. 4 is a characteristic chart showing relation between contact angle of the belt being wrapped around the pulley and $e^{\mu\theta}$.

In the drawings, reference numeral 1 designates an internal combustion engine, numeral 2 designates a crank pulley, and numeral 3 designates an electric rotating machine. Numeral 4 designates an auxiliary machine A, numeral 5 designates an auxiliary machine B, numeral 6 designates an auxiliary machine C, and numeral 7 designates a belt. Numeral 13 designates an electric rotating machine pulley mounted on a rotary shaft of the electric rotating machine 3, and numerals 14, 15, 16 designate pulleys mounted on the auxiliary machine 4, the auxiliary machine 5, and the auxiliary machine 6, respectively.

The electric rotating machine 3 is a motor generator having a motor function to start an engine and also a generator function. The electric rotating machine 3 causes the pulley 13*b* to rotate in a direction indicated by the arrows of FIG. 2 by a rotational power generated at the time of starting the engine. After the engine has been started, the engine causes the crank pulley 2 to rotate in a direction indicated by the arrows of FIG. 2 with a rotational power generated by the engine itself.

A stationary pulley 18 is located on the belt slack side with respect to the electric rotating machine 13, and adjusted so that a contact angle θ of the belt (hereinafter referred to as belt contact angle θ) that is wrapped around the electric rotating machine pulley 13 may be in a range of not less than 130° and not more than 230°.

The reasons why the minimum of the above-mentioned belt contact angle θ are restrained to be 130° is to assure that ratio between a tight side belt tension and a slack side belt tension is not less than 3, described later, and to desirably prevent the belt from occurrence of slippage with an initial tension as small as possible. On the other hand, the reason why the maximum belt contact angle θ is restrained to be 230° is to avoid difficulty in arranging a pulley layout in the case of the maximum belt contact angle θ exceeding 230°.

Meanwhile, a first stopper-equipped auto-tensioner 17 causes to locate an idle pulley 17*a* between the electric rotating machine pulley 13 and the crank pulley 2 (that is the belt slack side of the crank pulley). Thus the first stopper-equipped auto-tensioner 17 functions so that tension on the belt slack side with respect to the crank pulley may be constant without reduction at the time of driving the auxiliary machines by means of the engine.

Furthermore, since the first stopper-equipped auto-tensioner 17 is located on the belt tight side of the electric rotating machine pulley at the time of starting the engine, position of the idle pulley 17*a* is fixed. As a result, a belt tension required for transmitting to the crank pulley a starting torque of the electric rotating machine is not reduced.

Figure 9:
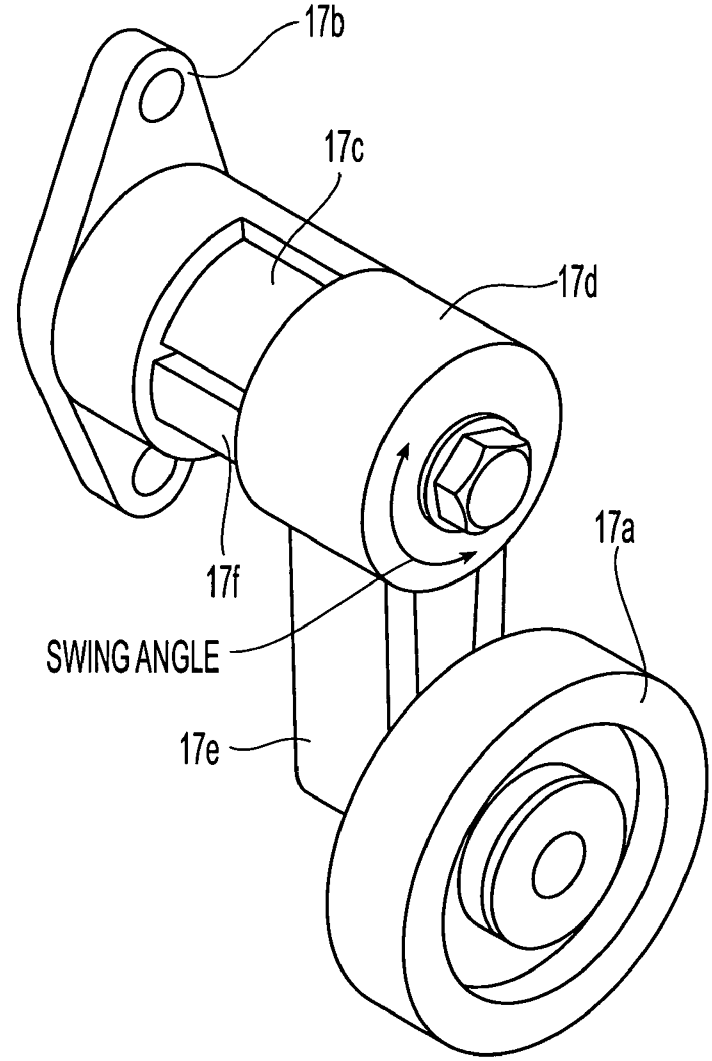
FIG. 9 is a perspective view showing a construction of a first and second stopper-equipped auto-tensioner according to the third embodiment of the invention.

The mentioned first stopper-equipped auto-tensioner 17 is exemplified in the Japanese Patent Publication (unexamined) No. 59555/2001, and is shown in FIG. 9.

The first stopper-equipped auto-tensioner 17 includes a base part 17*b* secured to, e.g., body of the engine, and a moving part 17*d* rotatably assembled via an elastic body 17*c* onto the base part 17*b*. The idle pulley 17*a* is rotatably mounted to an end of an arm 17*e* formed integrally with the moving part 17*d*.

The moving part 17*d* is provided with a stopper 17*f* that defines a swing angle of the arm 17*e* relative to the base part 17*b*. Position of the idle pulley 17*a* is restrained as a result that the foregoing stopper 17*f* comes in contact with the base part 17*b* in a rotation direction.

Accordingly, even if increasing the torque (belt tension applied to the idle pulley 17*a*) that causes the moving part 17*d* to rotate against the elastic body 17*c*, a swing angle of the arm 17*e* is restricted by the stopper 17*f* coming in contact with the base part 17*b*.

Now, operations of the belt drive system according to the first embodiment are described.

For starting the engine, a rotational power, which is generated by operation of the electric rotating machine 3 acting as an electric motor, is transmitted to the crank pulley 2 via the electric rotating machine pulley 13 and the belt 7. Thus the crank pulley 2 rotates, and the engine is started.

At the time of this start-up of the engine, the electric rotating machine 3 rotates (clockwise in FIG. 2) and the idle pulley 17*a* side of the first stopper-equipped auto-tensioner 17 comes to the belt tight side with respect to the electric rotating machine 13. Accordingly, a large belt tension is applied to the idle pulley 17*a* of the first stopper-equipped auto-tensioner 17.

Thus, in the first stopper-equipped auto-tensioner 17, the arm 17*e* swings and the stopper 17*f* of the moving part 17*d* comes in contact with the base part 17*b*, whereby position of the idle pulley 17*a* is made stationary. As a result, a belt tension on the belt tight side with respect to the electric rotating machine pulley 13 is maintained without reduction, and a rotational torque for rotating the engine 1 can be transmitted via the crank pulley 2.

Now, change in belt tension at each pulley and at each belt portion between the pulleys at the time of starting the engine is described with reference to FIG. 3.

In this respect, circled numerals shown in FIG. 3 correspond to the circled numerals between the pulleys shown in FIG. 2.

First, theoretical condition for preventing the belt from slippage on the pulleys is described.

This condition is satisfied when the following relation is established.

$$\frac{Tt - mv^2}{Ts - mv^2} < e^{\mu\theta}$$

Expression 1:

where:

Tt is a tight side belt tension,

Ts is a slack side belt tension, m is a belt mass per unit length, v is a belt speed, μ is a friction coefficient (between pulley and belt), and θ is a belt contact angle With the above-mentioned relational expression, in the case where the belt speed can be determined to be vanishingly small, the expression can be transformed as follows:

$$\frac{Tt}{Ts} < e^{\mu\theta}$$

Expression 2:

That is, supposing that ratio of a belt tension between the tight side and the slack side is smaller than $e^{\mu\theta}$, no slippage occurs theoretically.

FIG. 4 shows a relation between the contact angle θ and a value $e^{\mu\theta}$ that is obtained using a general value of 0.512 as a friction coefficient μ of a v live belt.

It is understood from a graph of FIG. 4 that, in the case where the contact angle θ is 170°, the value of $e^{\mu\theta}$ is approximately 4.5.

Next, for easy understanding, a difference in belt tension between on the belt tight side and on the slack side of the crank pulley, the difference being required for staring the engine, and a difference in belt tension between the belt tight side and the slack side with respect to each auxiliary machine pulley, the difference being likewise required for driving each auxiliary machine, are respectively assumed as follows:

(1) The difference in tension between the tight side and the slack side of the crank pulley required for staring the engine=400N;

(2) The difference in tension between the tight side and the slack side of the auxiliary machine A pulley required for driving the auxiliary machine A=200N;

(3) The difference in tension between the tight side and the slack side of the auxiliary machine B pulley required for driving the auxiliary machine B=150N;

(4) The difference in tension between the tight side and the slack side of the auxiliary machine C pulley required for driving the auxiliary machine C=100N (5) The difference in tension between the tight side and the slack side of the electric rotating machine pulley required for driving the electric rotating machine as a generator=300N Then on the assumption that contact angle of the belt wrapped around the electric rotating machine pulley is 170° and a switch of the auxiliary machine A is OFF to be no load at the time of start-up, changes in belt tension at each pulley and at each belt portion between the pulleys are shown as indicated by the solid line in the graph of FIG. 3. An initial tension that is determined by a set tension of the first stopper-equipped auto-tensioner at this time is 525N.

Then, after the engine has been started, a rotational power of the engine is transmitted to each auxiliary machine pulley via the belt, whereby each auxiliary machine is driven.

At the time of driving the auxiliary machines, although a portion between the crank pulley 2 and the electric rotating machine pulley 13 is on the slackest side of the belt 7, the tension on the slackest side is not reduced largely as compared with the initial set tension of the first stopper-equipped auto-tensioner 17. This is because the idle pulley 17*a* of the first stopper-equipped auto-tensioner 17 moves in the direction of increasing the belt tension. In this manner, a belt tension required for driving the auxiliary machines by means of the engine is maintained.

In the above-mentioned example, although the electric rotating machine 3 operates as an electric motor, it is also preferable that the electric rotating machine 3 operating both as an electric motor and as a generator is employed.

In this case, electric rotating machine switching control means for switching the electric rotating machine 3 to an electric motor or to a generator is employed. Thus, at the time of starting the internal combustion engine 1 via the crank pulley 2 by means of the electric rotating machine 3, position of the idle pulley 17*a* is fixed. On the other hand, at the time of driving the electric rotating machine 3 as a generator via the crank pulley 2 by means of the internal combustion engine 1, the idle pulley 17*a* comes to be movable.

Further, it is also preferable that an auxiliary machine-equipped electric rotating machine having both electric rotating machine function as an electric motor and auxiliary function by connecting any auxiliary machine element to a rotary shaft of the electric rotating machine, which performs the mentioned electric rotating machine function, is employed as the electric rotating machine 3.

This electric rotating machine 3 equipped with an auxiliary machine performs an electric rotating machine function to operate as an electric motor, as well as an auxiliary machine function with the auxiliary machine element connected to the rotary shaft (not shown).

In this case, at the time of starting the internal combustion engine 1 via the crank pulley 2 by means of the auxiliary machine-equipped electric rotating machine 3, position of the idle pulley 17*a* is fixed. On the other hand, at the time of driving the auxiliary machine-equipped electric rotating machine 3 and the auxiliary machines 4, 5, 6 via the crank pulley 2 by means of the internal combustion engine 1, the idle pulley 17*a* comes to be movable.

Further, it is also preferable that an auxiliary machine-equipped electric rotating machine having both electric rotating machine function to operate as an electric motor or a generator and an auxiliary function by connecting an auxiliary machine element to a rotary shaft of an electric rotating machine, which performs the mentioned electric rotating machine function, is employed as the electric rotating machine 3.

This electric rotating machine 3 equipped with an auxiliary machine performs an electric rotating machine function to operate as an electric motor, as well as an auxiliary machine function with the auxiliary machine element connected to the rotary shaft (not shown).

In this case, at the time of starting the internal combustion engine 1 via the crank pulley 2 by means of the auxiliary machine-equipped electric rotating machine 3, position of the idle pulley 17*a* is fixed. On the other hand, at the time of driving the auxiliary machine-equipped electric rotating machine 3 via the crank pulley 2 by means of the internal combustion engine 1, the idle pulley 17*a* comes to be movable.

Accordingly, in the above-mentioned constitution according to this first embodiment, it is possible to constitute a belt drive system that is capable of changing the above-mentioned contact angle by moving and adjusting positions of the mentioned stationary tension pulley 18 and the mentioned idle pulley 17a of the first stopper-equipped auto-tensioner.

As a result of employing this constitution, positions of the mentioned stationary tension pulley 18 and the mentioned idle pulley 17a of the first stopper-equipped auto-tensioner can be moved and adjusted, thereby enabling the above-mentioned contact angle to vary. In this manner, contact angle can be adjusted accordingly depending on load conditions, and an initial tension can be appropriately set as required.

This first embodiment includes constitutions described in the following paragraph (1) to (5), and achieves advantages respectively as described in each paragraph.

(1) A belt drive system including: an electric rotating machine operating as an electric motor or a generator; electric rotating machine switching control means for switching the mentioned electric rotating machine to the electric motor or to the generator; an electric rotating machine pulley that is mounted on a rotary shaft of the mentioned electric rotating machine; an auxiliary machine pulley that is connected to a rotary shaft of the auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which a stationary tension pulley is located on the side opposite to the crank pulley with respect to the mentioned electric rotating machine pulley so that contact angle of the belt wrapped around the mentioned electric rotating machine pulley in contact therewith may be in a range of not less than 130° and not more than 230°; an idle pulley of a first stopper-equipped auto-tensioner is located between the mentioned electric rotating machine pulley and the mentioned internal combustion engine crank pulley; and position of the mentioned idle pulley is fixed at the time of starting the mentioned internal combustion engine by means of the mentioned electric rotating machine, while the mentioned idle pulley coming to be movable at the time of driving the mentioned electric rotating machine as a generator by means of the mentioned internal combustion engine.

This constitution brings about the following advantages.

That is, the stationary tension pulley is located on the belt slack side with respect to the electric rotating machine pulley, and contact angle of the belt wrapped around the electric rotating machine pulley is in the range of not less than 130° and not more than 230°. Therefore, slippage hardly occurs even if a tension ratio between the belt tight side and the slack side becomes large. Further, since the idle pulley of the first stopper-equipped auto-tensioner is located between the electric rotating machine pulley and the crank pulley, position of the idle pulley is fixed even if the first stopper-equipped auto-tensioner side comes to the tight side at the time of starting the engine resulting in no reduction in tension. Furthermore, since the first stopper-equipped auto-tensioner side comes to the belt slack side of the crank pulley at the time of driving the auxiliary machines by means of the engine, the mentioned idle pulley moves and functions to keep a constant tension.

As a result, an initial tension is not set to be especially high both at the time of starting the engine and at the time of driving the auxiliary machines by means of the engine. Consequently, it is not necessary to increase durability of the shaft, bearing, and other support structure of the auxiliary machine. In this manner, an advantage is assured such that growing in size and/or increase in cost can be prevented.

(2) A belt drive system including: an electric rotating machine operating as an electric motor; an electric rotating machine pulley that is mounted on a rotary shaft of the mentioned electric rotating machine; an auxiliary machine pulley that is connected to a rotary shaft of an auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which a stationary tension pulley is located on the side opposite to the crank pulley with respect to the mentioned electric rotating machine pulley so that contact angle of the belt wrapped around the mentioned electric rotating machine pulley in contact therewith may be in a range of not less than 130° and not more than 230°; an idle pulley of a first stopper-equipped auto-tensioner is located between the mentioned electric rotating machine pulley and the mentioned internal combustion engine crank pulley; and position of the mentioned idle pulley is fixed at the time of starting the mentioned internal combustion engine by means of the mentioned electric rotating machine, while the mentioned idle pulley coming to be movable at the time of driving the mentioned electric rotating machine by means of the mentioned internal combustion engine.

This constitution brings about the following advantages.

In the case of employing an electric rotating machine operating as an electric motor, the same advantage as in the above-mentioned paragraph (1) is performed.

(3) A belt drive system including: an auxiliary machine-equipped electric rotating machine having an electric rotating machine function to operate as an electric motor or a generator and an auxiliary machine function to operate as an auxiliary machine by connecting an auxiliary machine element to a rotary shaft of the electric rotating machine which performs the mentioned electric rotating machine function; electric rotating machine switching control means for switching the mentioned electric rotating machine to the electric motor or to the generator; an electric rotating machine pulley mounted on the rotary shaft of the mentioned auxiliary machine-equipped electric rotating machine; an auxiliary machine pulley that is connected to a rotary shaft of the auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which a stationary tension pulley is located on the side opposite to the crank pulley with respect to the mentioned auxiliary machine-equipped electric rotating machine pulley so that contact angle of the belt that is wrapped around the mentioned auxiliary machine-equipped electric rotating machine pulley in contact therewith may be in a range of not less than 130° and not more than 230°; an idle pulley of a first stopper-equipped auto-tensioner is located between the mentioned auxiliary machine-equipped electric rotating machine pulley and the mentioned internal combustion engine crank pulley; and position of the mentioned idle pulley is fixed at the time of starting the mentioned internal combustion engine by means of mentioned auxiliary machine-equipped electric rotating machine; while mentioned idle pulley comes to be movable at the time of driving the mentioned auxiliary machine-equipped electric rotating machine as a generator by means of the mentioned internal combustion engine.

This constitution brings about the following advantages.

In the case of employing the auxiliary machine-equipped electric rotating machine having both electric rotating machine function to operate as an electric motor or a generator and auxiliary machine function, the same advantage as in the above-mentioned paragraph (1) is performed.

(4) A belt drive system including: an auxiliary machine-equipped electric rotating machine having an electric rotating machine function to operate as an electric motor and an auxiliary machine function to operate as an auxiliary machine by connecting an auxiliary machine element to a rotary shaft of an electric rotating machine which performs the mentioned electric rotating machine function; an electric rotating machine pulley mounted on the rotary shaft of the mentioned auxiliary machine-equipped electric rotating machine; an auxiliary machine pulley that is connected to a rotary shaft of the auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which a stationary tension pulley is located on the side opposite to the crank pulley with respect to the mentioned auxiliary machine-equipped electric rotating machine pulley so that contact angle of the belt that is wrapped around the mentioned auxiliary machine-equipped electric rotating machine pulley in contact therewith may be in a range of not less than 130° and not more than 230°; an idle pulley of a first stopper-equipped auto-tensioner is located between the mentioned auxiliary machine-equipped electric rotating machine pulley and the mentioned internal combustion engine crank pulley; and position of the mentioned idle pulley is fixed at the time of starting the mentioned internal combustion engine by means of the mentioned auxiliary machine-equipped electric rotating machine; while the mentioned idle pulley comes to be movable at the time of driving the mentioned auxiliary machine-equipped electric rotating machine and auxiliary machine by means of the mentioned internal combustion engine.

This constitution brings about the following advantages.

In the case of employing the auxiliary machine-equipped electric rotating machine having both electric rotating machine function to operate as an electric motor and auxiliary machine function, the same advantage as in the above-mentioned paragraph (1) is performed.

(5) A belt drive system as defined in any of the constitutions of the foregoing paragraphs (1) to (4) of this first embodiment, in which position of the mentioned stationary tension pulley and position of the mentioned idle pulley of the first stopper-equipped auto-tensioner are moved and adjusted thereby enabling the mentioned contact angle to change.

This constitution brings about the following advantages.

Since position of the mentioned stationary tension pulley and that of the mentioned idle pulley of the first stopper-equipped auto-tensioner are moved and adjusted, thereby enabling the mentioned contact angle to vary, the contact angle can be adjusted accordingly depending on load conditions, and an initial tension can be set appropriately as required.

Embodiment 2

Figure 5:
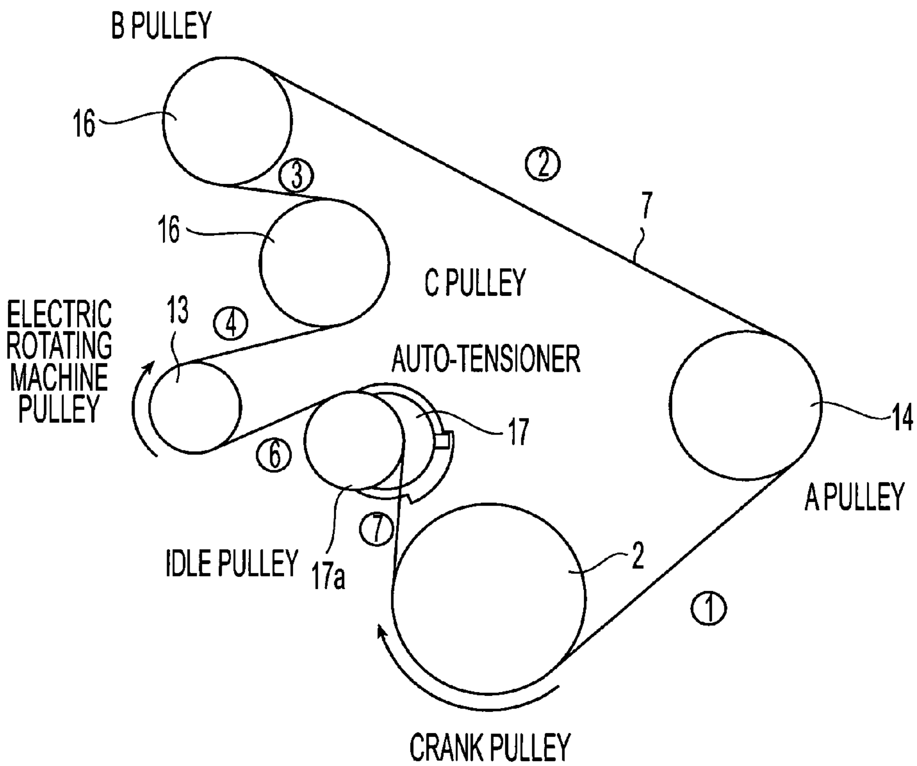
FIG. 5 is a layout diagram showing a constitution of a belt drive system according to a second embodiment of the invention.
Figure 6:
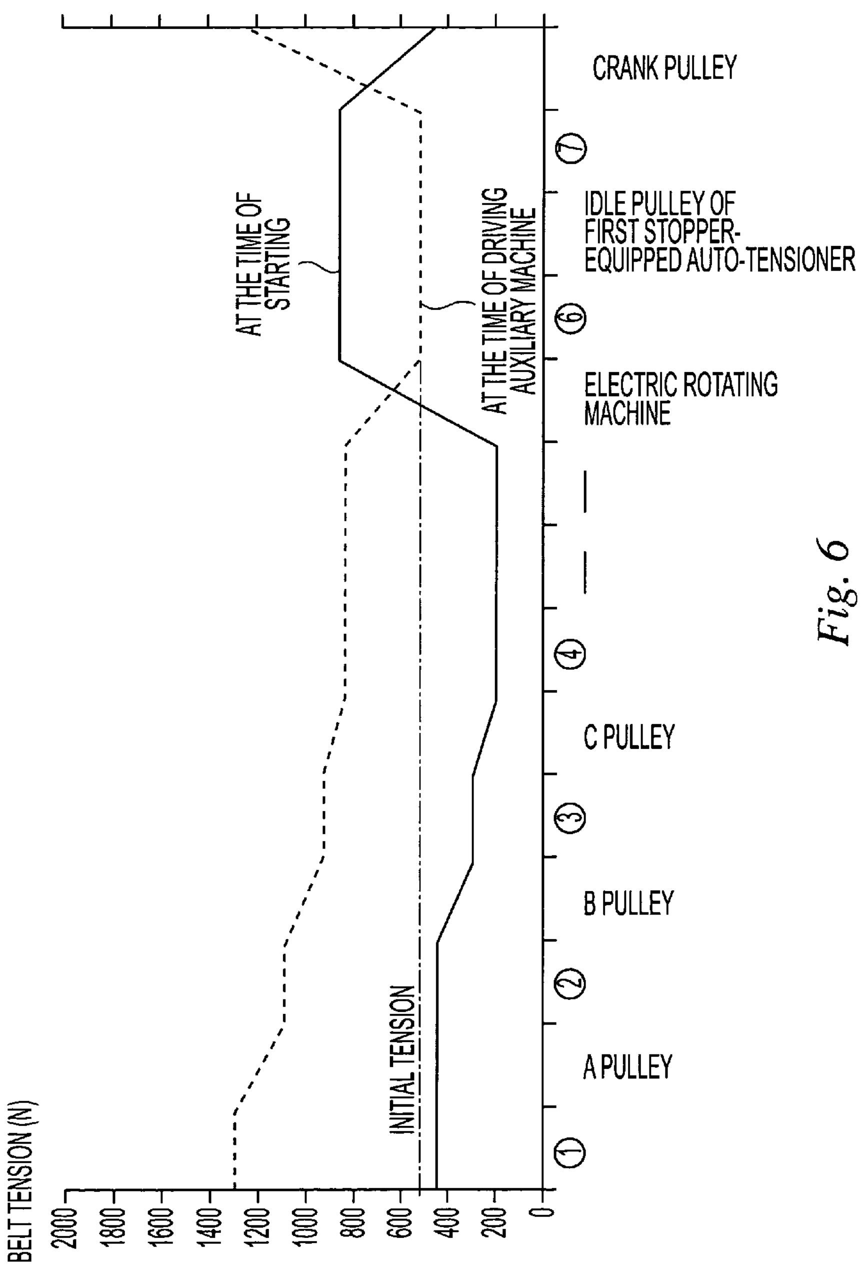
FIG. 6 is a characteristic chart showing changes in belt tension at each pulley and at each portion between the pulleys according to the second embodiment of the invention.

A second embodiment according to this invention is described with reference to FIGS. 5 and 6. FIG. 5 is a layout diagram of a belt drive system according to the second embodiment, and FIG. 6 is a characteristic chart showing change in belt tension at each pulley and at each portion between the pulleys according to the second embodiment.

In this second embodiment, constitutions other than specific ones described hereinafter are the same as those in the foregoing first embodiment, and perform the same functions and advantages. In the drawings, like reference numerals are designated to the same or like parts.

In the belt drive system according to this second embodiment, the stationary tension pulley 18, which is shown in FIG. 2 of the foregoing first embodiment, is replaced with an auxiliary machine C pulley 16 at position of the stationary tension pulley 18.

Operations of the belt drive system according to this second embodiment are the same as in the foregoing first embodiment. FIG. 6 shows change in belt tension at each pulley and at each portion between the pulleys at the time of starting the engine and at the time of driving the auxiliary machine by means of an engine on the same conditions as in the foregoing first embodiment.

A graph showing change in belt tension in FIG. 6 is the same as in the foregoing first embodiment, and a necessary initial tension at this time is likewise 525N.

This second embodiment includes constitutions described in the following paragraph (1) to (4), and achieves advantages respectively as described in each paragraph.

(1) A belt drive system including: an electric rotating machine operating as an electric motor or a generator; electric rotating machine switching control means for switching the mentioned electric rotating machine to the electric motor or to the generator; an electric rotating machine pulley that is mounted on a rotary shaft of the mentioned electric rotating machine; an auxiliary machine pulley that is connected to a rotary shaft of an auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which the mentioned auxiliary machine pulley is located on the side opposite to the crank pulley with respect to the mentioned electric rotating machine pulley so that contact angle of the belt wrapped around the mentioned electric rotating machine pulley in contact therewith may be in a range of not less than 130° and not more than 230°; an idle pulley of a first stopper-equipped auto-tensioner is located between the mentioned electric rotating machine pulley and the mentioned internal combustion engine crank pulley; and position of the mentioned idle pulley is fixed at the time of starting the mentioned internal combustion engine by means of the mentioned electric rotating machine, while the mentioned idle pulley coming to be movable at the time of driving the mentioned electric rotating machine as a generator by means of the mentioned internal combustion engine.

This constitution brings about the following advantages.

Contact angle of the belt wrapped around the electric rotating machine pulley is constituted so as to be in the range of not less than 130° and not more than 230°. Therefore, slippage hardly occurs even if a tension ratio between the belt tight side and the belt slack side becomes large. Further, the idle pulley of the first stopper-equipped auto-tensioner is located between the electric rotating machine pulley and the crank pulley. Therefore, position of the idle pulley is fixed resulting in no reduction in tension even if the first stopper-equipped auto-tensioner side becomes the tight side at the time of starting the engine. Furthermore, since the first stopper-equipped auto-tensioner side is on the belt slack side of the crank pulley at the time of driving the auxiliary machines by means of the engine, the mentioned, idle pulley moves and functions to keep a constant tension.

As a result, initial tension is not set to be especially high both at the time of starting the engine and at the time of driving the auxiliary machines. Consequently, it is not necessary to increase durability of the shaft, bearing, and other support structure of the auxiliary machine. In this manner, an advantage is assured such that growing in size and/or increase in cost can be prevented.

(2) A belt drive system including: an electric rotating machine operating as an electric motor; an electric rotating machine pulley that is mounted on a rotary shaft of the mentioned electric rotating machine; an auxiliary machine pulley that is connected to a rotary shaft of an auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which the mentioned auxiliary machine pulley is located on the side opposite to the crank pulley with respect to the mentioned electric rotating machine pulley so that contact angle of the belt wrapped around the mentioned electric rotating machine pulley in contact therewith may be in a range of not less than 130° and not more than 230°; an idle pulley of a first stopper-equipped auto-tensioner is located between the mentioned electric rotating machine pulley and the mentioned internal combustion engine crank pulley; and position of the mentioned idle pulley is fixed at the time of starting the mentioned internal combustion engine by means of the mentioned electric rotating machine, while the mentioned idle pulley coming to be movable at the time of driving the mentioned electric rotating machine by means of the mentioned internal combustion engine.

This constitution brings about the following advantages.

In the case of employing an electric rotating machine operating as an electric motor, the same advantage as in the above-mentioned paragraph (1) is performed.

(3) A belt drive system including: an auxiliary machine-equipped electric rotating machine having an electric rotating machine function to operate as an electric motor or a generator and an auxiliary machine function to operate as an auxiliary machine by connecting an auxiliary machine element to a rotary shaft of the electric rotating machine which performs the mentioned electric rotating machine function; electric rotating machine switching control means for switching the mentioned electric rotating machine to the electric motor or to the generator; an electric rotating machine pulley mounted on a rotary shaft of the mentioned auxiliary machine-equipped electric rotating machine; an auxiliary machine pulley that is connected to a rotary shaft of the auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which the mentioned auxiliary machine pulley is located on the side opposite to the crank pulley with respect to the mentioned auxiliary machine-equipped electric rotating machine pulley so that contact angle of the belt that is wrapped around the mentioned electric rotating machine pulley in contact therewith may be in a range of not less than 130° and not more than 230°; an idle pulley of a first stopper-equipped auto-tensioner is located between the mentioned auxiliary machine-equipped electric rotating machine pulley and the mentioned internal combustion engine crank pulley; and position of the mentioned idle pulley is fixed at the time of starting the mentioned internal combustion engine by means of the mentioned auxiliary machine-equipped electric rotating machine; while mentioned idle pulley comes to be movable at the time of driving the mentioned auxiliary machine-equipped electric rotating machine as a generator by means of the mentioned internal combustion engine.

This constitution brings about the following advantages.

In the case of employing the auxiliary machine-equipped electric rotating machine having both electric rotating machine function to operate as an electric motor or a generator and auxiliary machine function, the same advantage as in the above-mentioned paragraph (1) is performed.

(4) A belt drive system including: an auxiliary machine-equipped electric rotating machine having an electric rotating machine function to operate as an electric motor and an auxiliary machine function to operate as an auxiliary machine by connecting an auxiliary machine element to a rotary shaft of an electric rotating machine which performs the mentioned electric rotating machine function; an electric rotating machine pulley mounted on the rotary shaft of the mentioned auxiliary machine-equipped electric rotating machine; an auxiliary machine pulley that is connected to a rotary shaft of the auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which the mentioned auxiliary machine pulley is located on the side opposite to the crank pulley with respect to the mentioned electric rotating machine pulley so that contact angle of the belt that is wrapped around the mentioned auxiliary machine-equipped electric rotating machine pulley in contact therewith may be in a range of not less than 130° and not more than 230°; an idle pulley of a first stopper-equipped auto-tensioner is located between the mentioned auxiliary machine-equipped electric rotating machine pulley and the mentioned internal combustion engine crank pulley; and position of the mentioned idle pulley is fixed at the time of starting the mentioned internal combustion engine by means of the mentioned auxiliary machine-equipped electric rotating machine; while the mentioned idle pulley comes to be movable at the time of driving the mentioned auxiliary machine-equipped electric rotating machine and auxiliary machine by means of the mentioned internal combustion engine.

This constitution brings about the following advantages.

In the case of employing the auxiliary machine-equipped electric rotating machine having both electric rotating machine function to operate as an electric motor and auxiliary machine function, the same advantage as in the above-mentioned paragraph (1) is performed.

Embodiment 3

Figure 7:
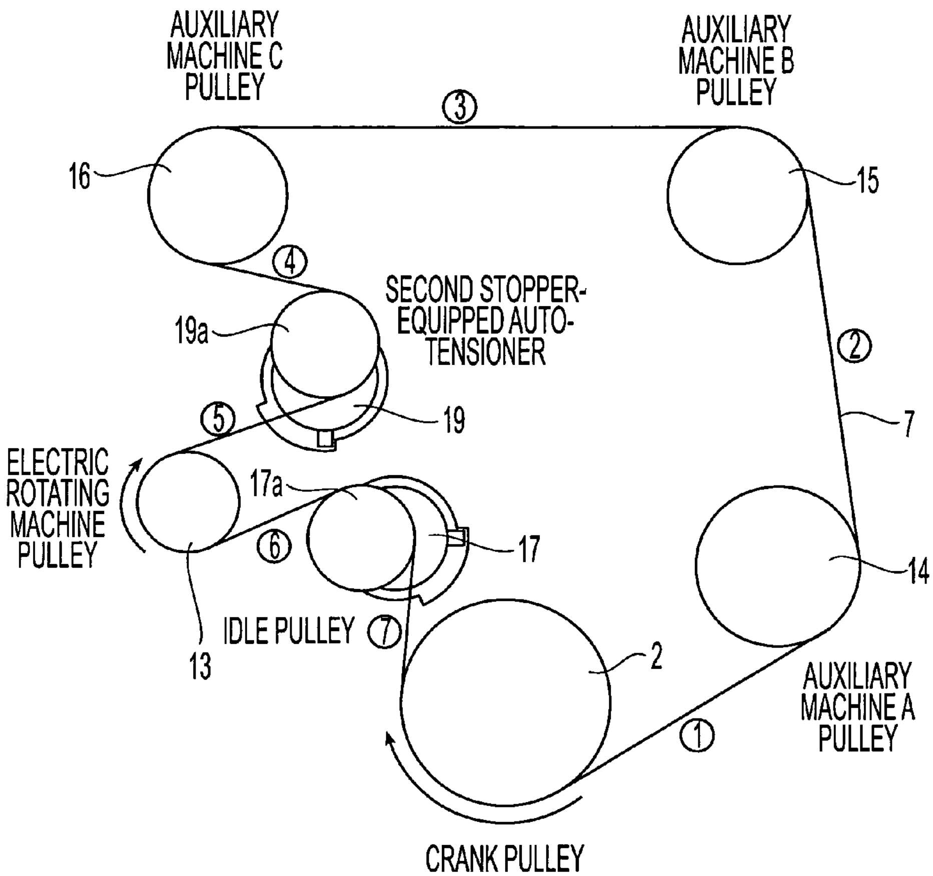
FIG. 7 is a layout diagram showing a constitution of a belt drive system according to a third embodiment of the invention.
Figure 8:
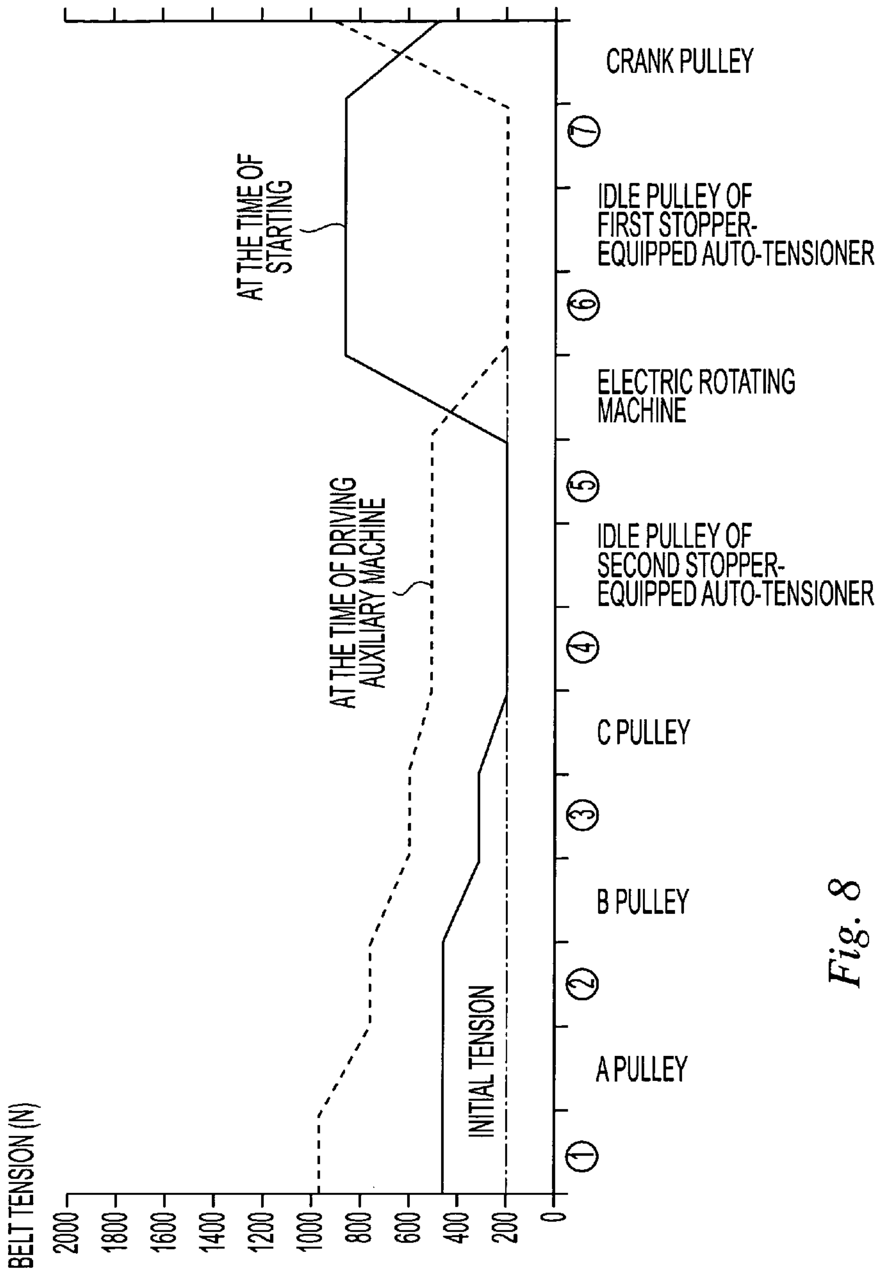
FIG. 8 is a characteristic chart showing changes in belt tension at each pulley and at each portion between the pulleys according to the third embodiment of the invention

A third preferred embodiment according to this invention is described with reference to FIGS. 7 to 9. FIG. 7 is a layout diagram showing a belt drive system according to the third embodiment, FIG. 8 is a characteristic chart showing change in belt tension at each pulley and at each portion between the pulleys, and FIG. 9 is a perspective view showing a constitution of first and second stopper-equipped auto-tensioner according to the third embodiment.

In this third embodiment, constitutions other than specific ones described herein are the same as those in the foregoing first and second embodiments, and perform the same operations and advantages. In the drawings, like reference numerals are designated to the same or like parts.

In the belt drive system according to this third embodiment, the stationary tension pulley 18, which is shown in FIG. 2 according to the first embodiment, is replaced with an idle pulley 19*a* of a second stopper-equipped auto-tensioner 19 at the position of the stationary tension pulley 18.

This second stopper-equipped auto tensioner 19 has the same structure as the mentioned first stopper-equipped auto-tensioner 17. When increasing a belt tension applied to an idle pulley 19*a*, the stopper 17*f* is brought into contact with the base part 17*b* thereby being restrained from moving, and position of the idle pulley 19*b* is fixed.

Now, operations of the belt drive system according to this third embodiment are described.

For starting the engine, the electric rotating machine 3 rotates (rotates right-handed in FIG. 7), and a rotational torque thereof is transmitted to the crank pulley 2 of the engine. Accordingly, the side of the idle pulley 17*a* of the first stopper-equipped auto-tensioner 17 comes to the belt tight side with respect to the electric rotating machine pulley 13, and therefore a large belt tension is applied to the idle pulley of the first stopper-equipped auto-tensioner 17. However, in the same manner as in the foregoing first embodiment, position of the idle pulley 17*a* is fixed, and therefore tension on the belt tight side with respect to the electric rotating machine pulley 13 is kept without reduction. Furthermore, tension on the belt slack side is kept constant by a set tension of the second stopper-equipped auto-tensioner 19.

In this respect, FIG. 8 shows change in belt tension at each pulley and at each belt portion between the pulleys at the time of starting the engine and at the time of driving the auxiliary machines by means of the engine in the case of this third embodiment under the same conditions as in the foregoing first embodiment.

As shown in the graph of FIG. 8 showing change in belt tension according to the third embodiment, tension at the belt portion ⑤, being the slackest side with respect to the electric rotating machine pulley 13 at the time of starting the engine is maintained at a set tension of the second stopper-equipped auto-tensioner 19. Furthermore, tension at the belt portions ⑥ and ⑦, being the slackest side with respect to the crank pulley 2 at the time of driving the auxiliary machines by means of the engine is maintained at a set tension of the first stopper-equipped auto-tensioner 17.

Furthermore, the second stopper-equipped auto-tensioner 19, which is located on the belt tight side with respect to the electric rotating machine pulley 13 at the time of driving the auxiliary machines by means of the engine, has a function of fixing position of the idle pulley 19*a* in the same manner as the first stopper-equipped auto tensioner 17. Therefore, as disclosed in the third prior art, for setting a tension by the first stopper-equipped auto-tensioner and a set tension of the second stopper-equipped auto tensioner, there is no need of establishing a difference in tension enough to be capable of driving the electric rotating machine as a generator. Furthermore, the set tension of the first and second stopper-equipped auto-tensioners can be the same tension value of, for example, 200N.

Now, to clarify the advantages of the first, second and third embodiments according to the invention as compared with those of the first, second and third prior arts, changes in belt tension at each pulley and at each portion between the pulleys according to the first, second and third prior arts are herein obtained using the same values as in the conditions adopted in the foregoing first embodiment according to this invention, and compared with those obtained in the first, second and third embodiments according to this invention.

Figure 12:
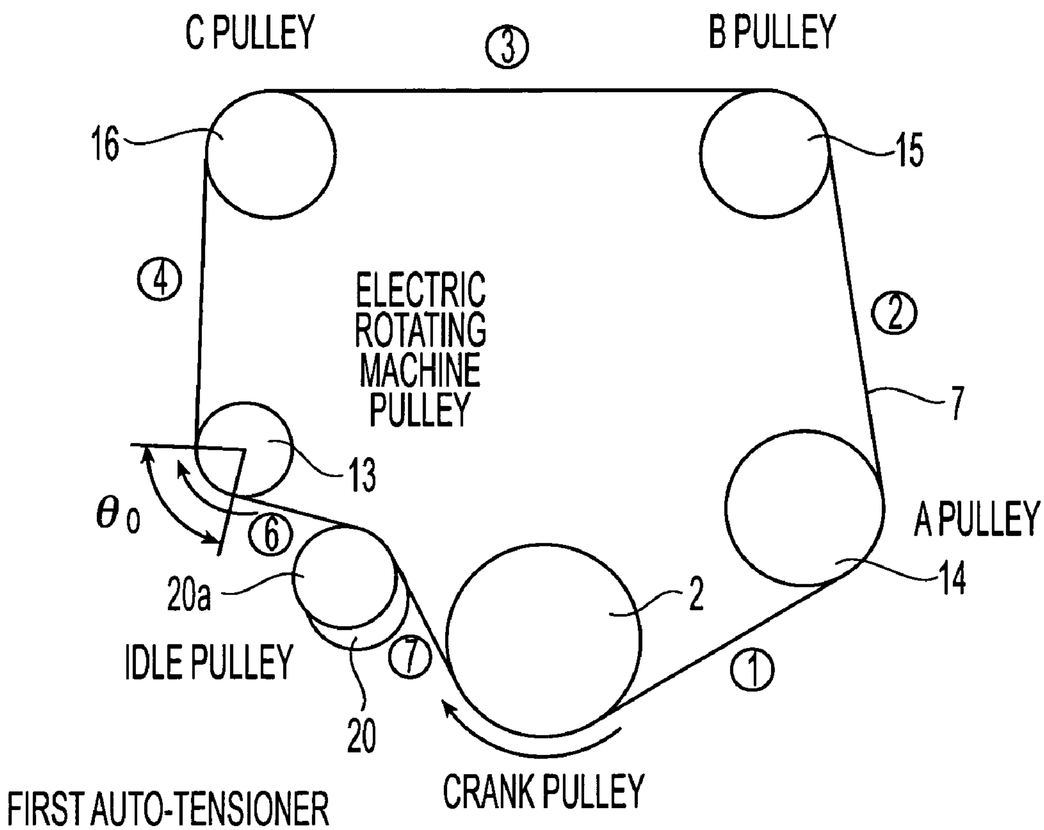
FIG. 12 is a layout diagram showing a constitution of a belt drive system according to a first prior art.
Figure 15:
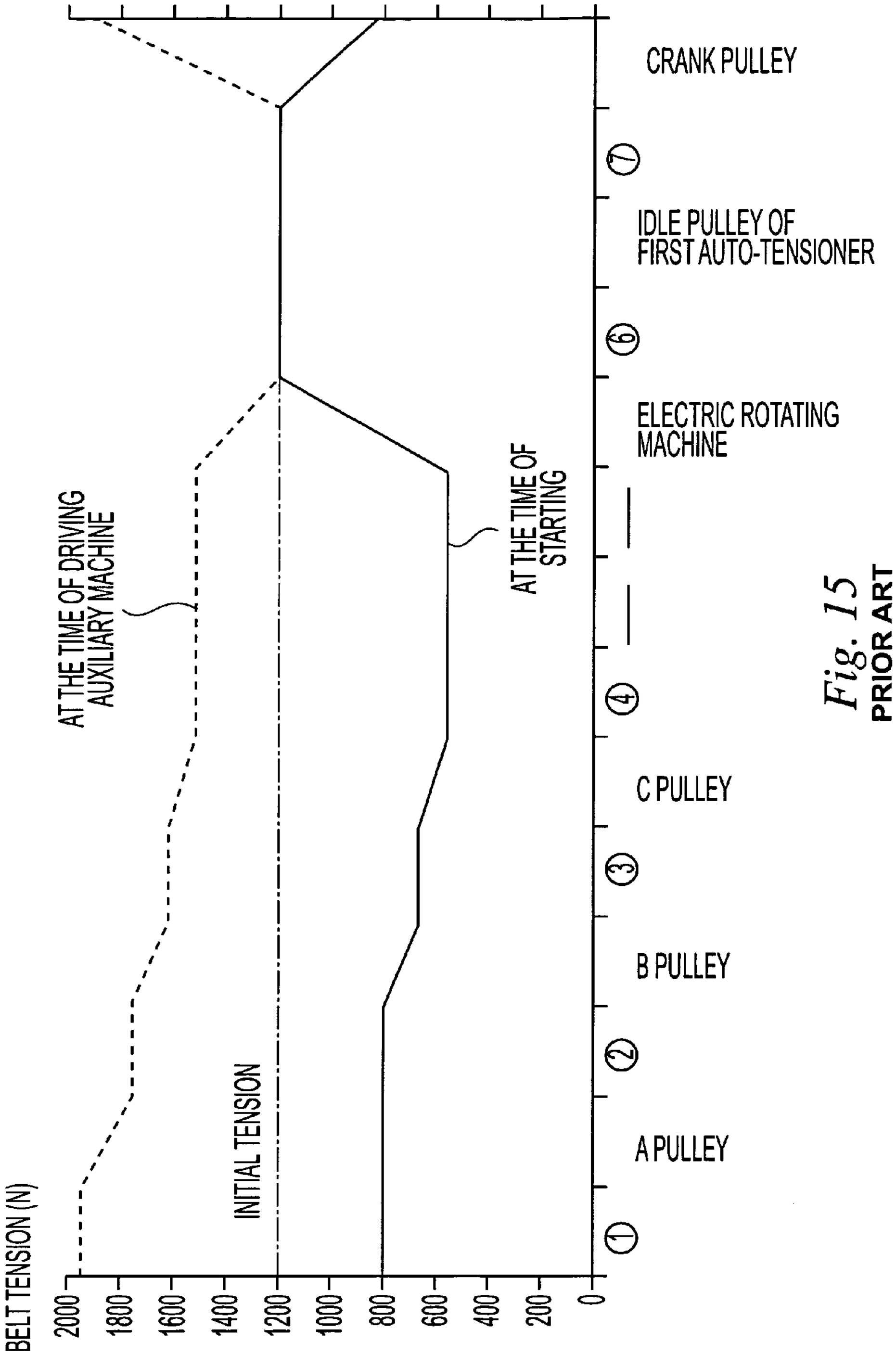
FIG. 15 is a characteristic chart showing changes in belt tension at each pulley and at each portion between the pulleys in FIG. 12.

First, with reference to FIG. 15, a graph regarding change in belt tension at each pulley and at each portion between the pulleys in the belt drive system according to the first prior art shown in FIG. 12 is described.

Referring to FIG. 12, a belt is wrapped around the electric rotating machine pulley 13 at a contact angle θo, and this contact angle θo is not sufficiently large as in the foregoing first embodiment according to this invention.

Herein, on the assumption that the contact angle θo is 90°, as shown in FIG. 4, ratio between the belt tight side tension and the belt slack side tension needs to be smaller than approximately 2.2.

Herein, conditions for the belt not to slip at the electric rotating machine pulley 13 at the time of starting the engine are expressed as follows, establishing that the necessary slackest side belt tension at this time is To.

$$2.2To>To+(100+150+400)\quad To>542 \qquad \text{Expression 3:}$$

Accordingly, tension on the belt slack side with respect to the electric rotating machine pulley 13 at the time of starting the engine must be assured to be at least 550N, and a belt tension at the portions ⑥ and ⑦, which are the belt tight sides with respect to the electric rotating machine pulley 13, must be maintained at a tension enough to be capable of driving the engine and each auxiliary machine. Therefore a tension of the first auto-tensioner 20 needs to be set to a high value.

When obtaining the minimum necessary tension set value of the first auto-tensioner 20 under the same conditions as in the foregoing first embodiment of the invention, the value is 1200N as shown in FIG. 15.

Figure 13:
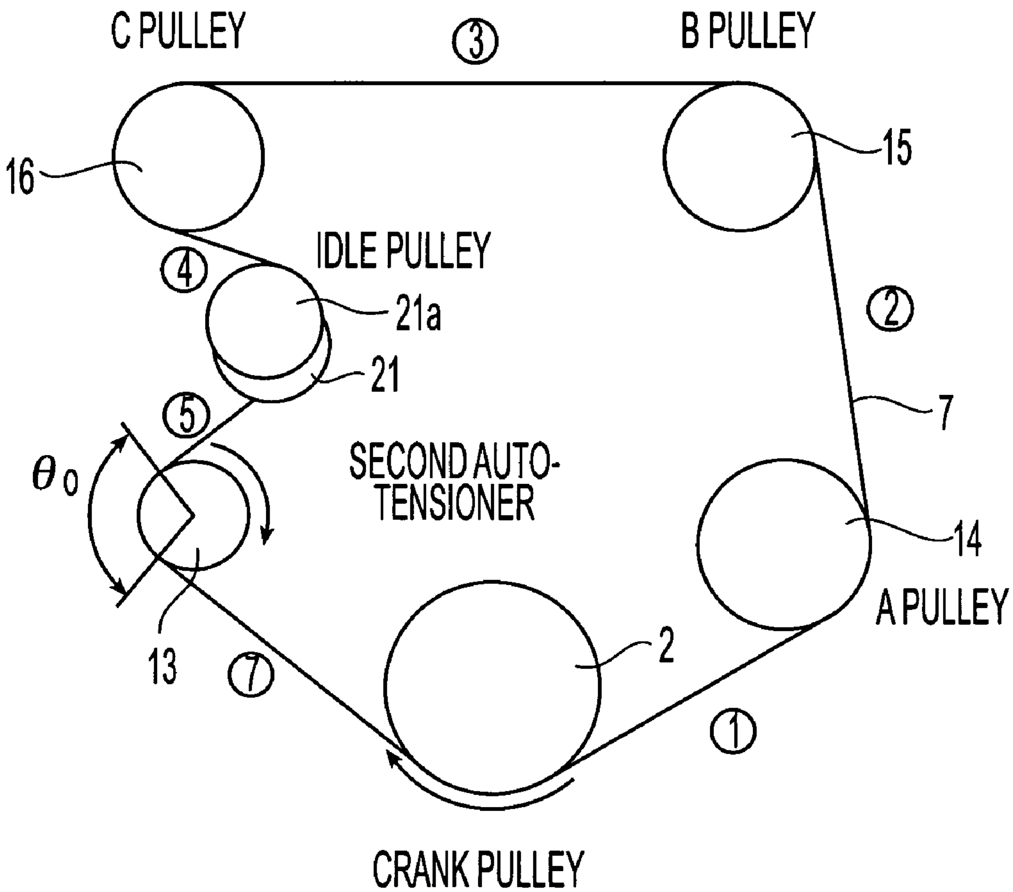
FIG. 13 is a layout diagram showing a constitution of a belt drive system according to a second prior art.
Figure 16:
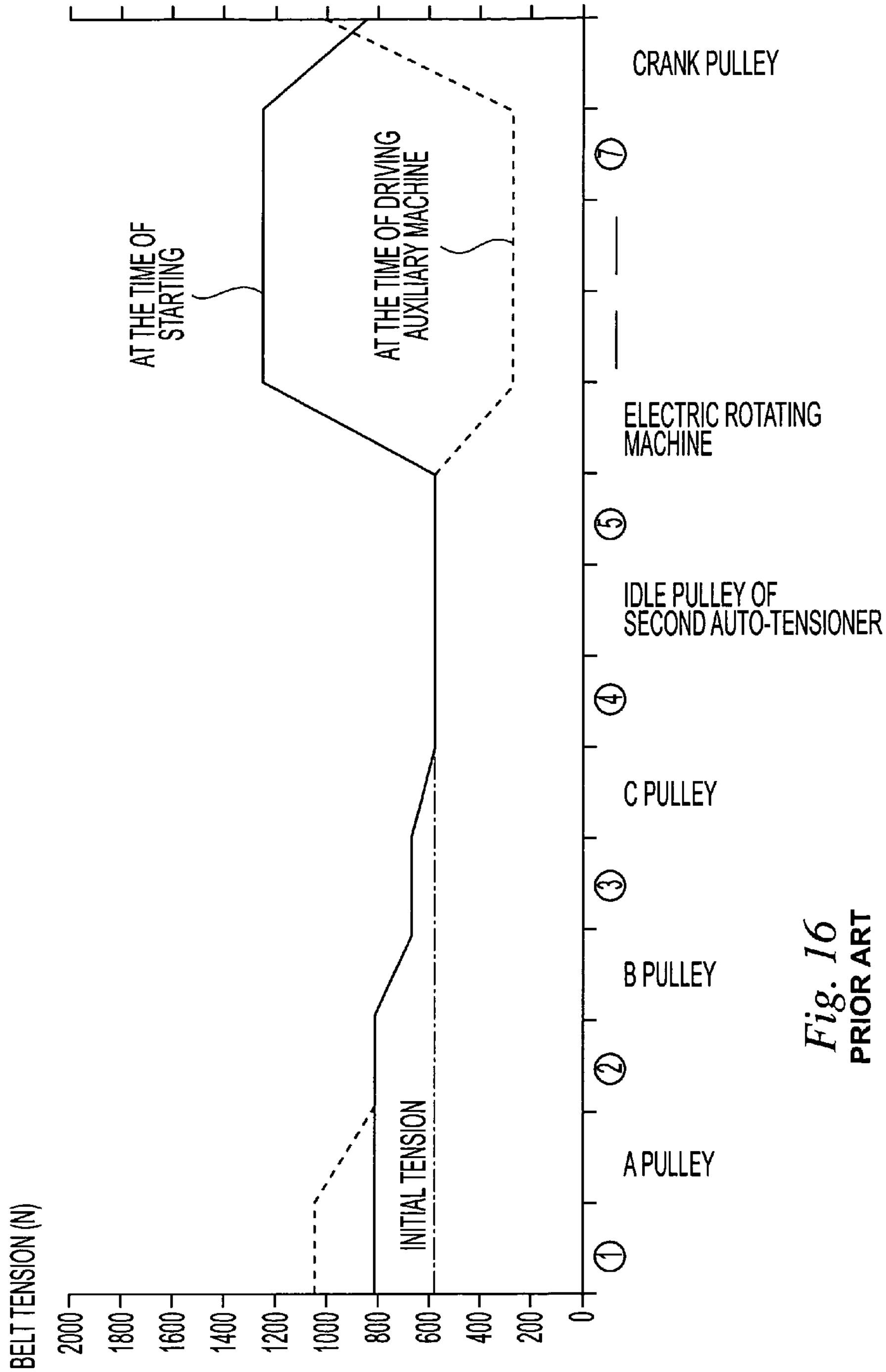
FIG. 16 is a characteristic chart showing changes in belt tension at each pulley and at each portion between the pulleys in FIG. 13.

Next, referring to FIG. 16, change in belt tension at each pulley and at each portion between the pulleys in the belt drive system according to the second prior art shown in the graph of FIG. 13, is described.

Referring to FIG. 13, the belt is wrapped around the electric rotating machine pulley 13 at a contact angle θo, and this contact angle θo is not sufficiently large as in the foregoing first embodiment according to this invention.

On the assumption that a contact angle θo is 90°, with reference to FIG. 4, ratio between the belt tight side tension and the belt slack side tension needs to be less than approximately 2.2.

Herein, conditions for the belt not to slip at the electric rotating machine pulley 13 at the time of driving the auxiliary machines by means of the engine are expressed as follows, establishing that the tight side belt tension ⑤ of the electric rotating machine pulley 13 required at this time is To.

$$To/To-300<2.2\ To>550 \qquad \text{Expression 4:}$$

It is understood from the above-mentioned expressions that the belt tight side tension To ⑤ with respect to the electric rotating machine pulley 13 at the time of driving the auxiliary machines by means of the engine needs to be larger than at least 550N.

Accordingly, a tight side belt tension of the electric rotating machine pulley 13 at the time of driving the auxiliary machines by means of the engine, that is, the minimum necessary set tension value of the second auto-tensioner is to be 560N.

In addition, as long as the minimum necessary set tension value of the second auto-tensioner is the mentioned 560N also at the time of starting the engine, condition for the belt not to slip at the electric rotating machine pulley 13 is satisfied as follows.

$$\frac{560+100+150+400}{560}=2.16<2.2$$

Figure 14:
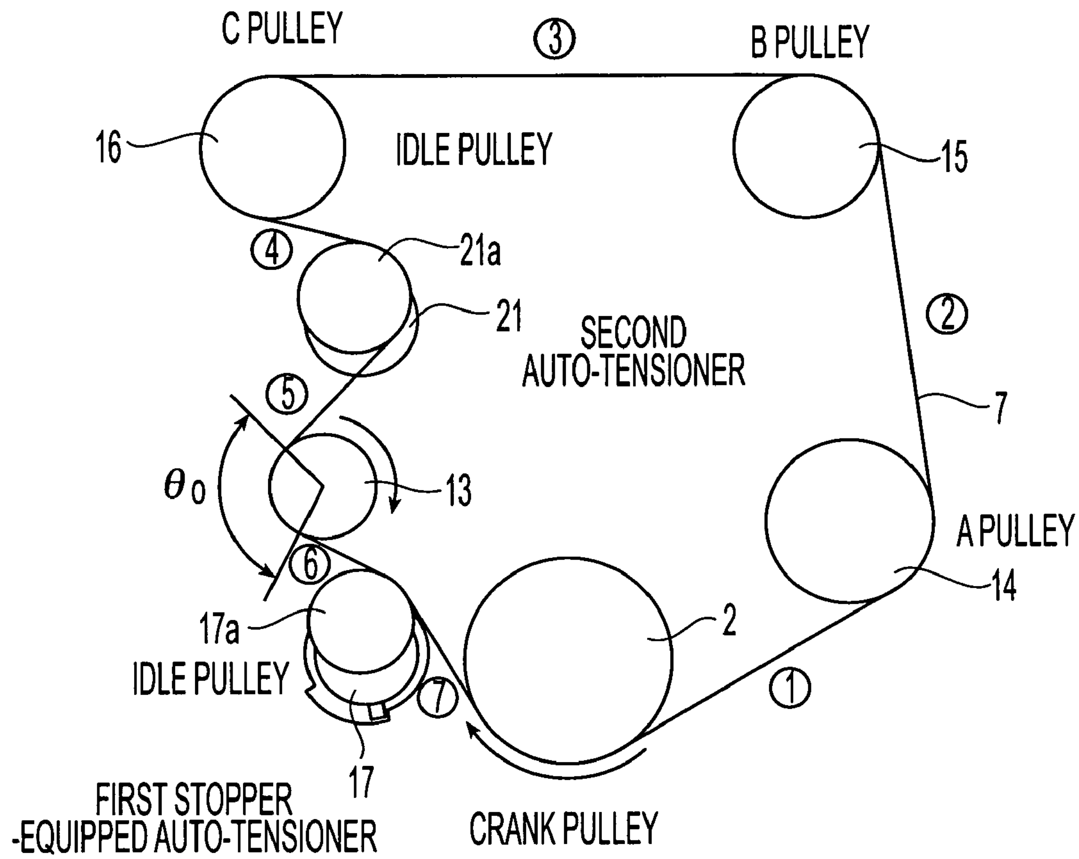
FIG. 14 is a layout diagram showing a constitution of a belt drive system according to a third prior art.
Figure 17:
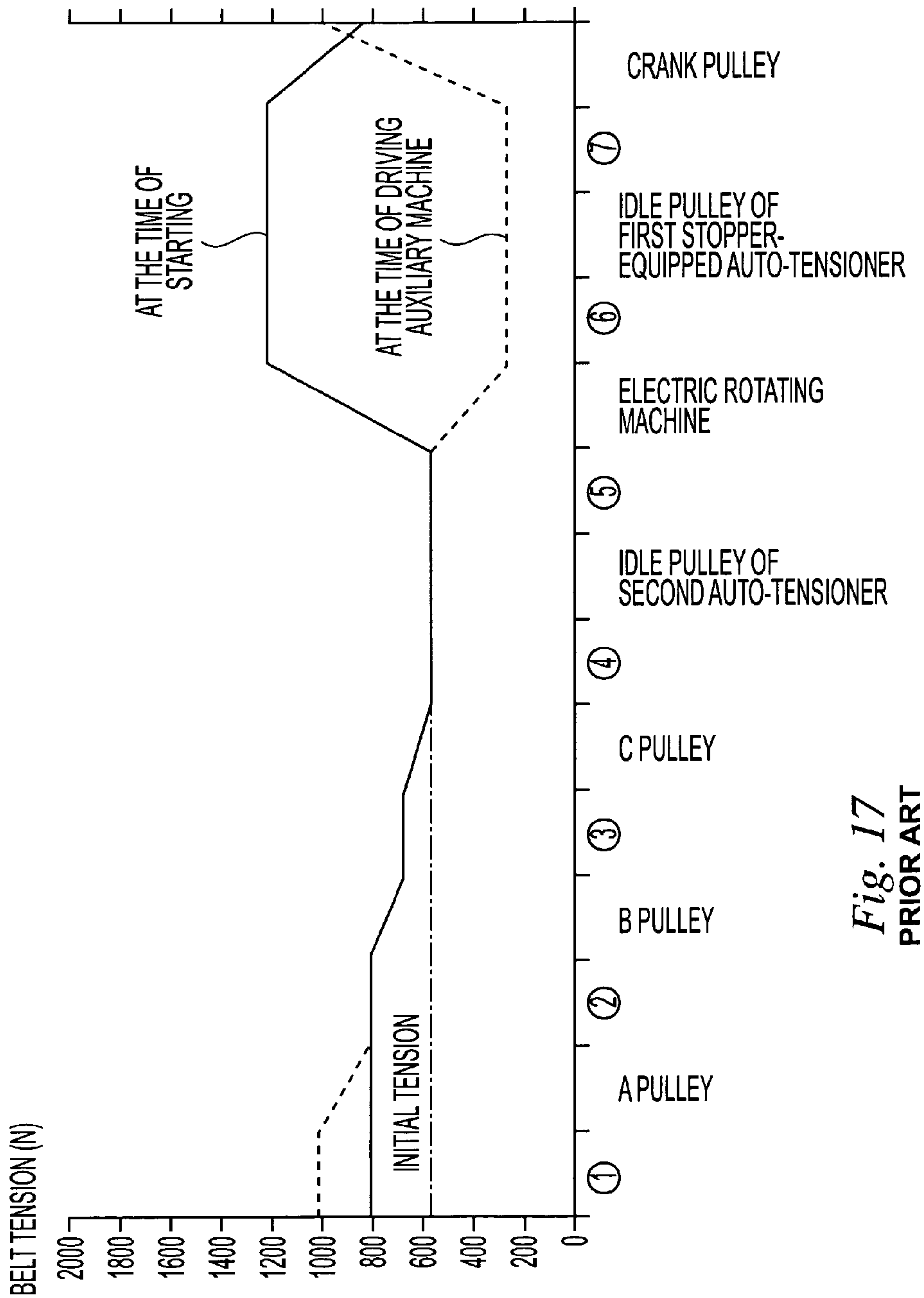
FIG. 17 is a characteristic chart showing changes in belt tension at each pulley and at each portion between the pulleys in FIG. 14.

Expression 5:

Then, referring to FIG. 17, change in belt tension at each pulley and at each portion between the pulleys in the belt drive system according to the third prior art shown in the graph of FIG. 14 is described.

Referring to FIG. 14, the belt is wrapped around the electric rotating machine pulley 13 at a contact angle θo, and this contact angle θo is not sufficiently large as in the foregoing first embodiment according to this invention.

On the assumption that a contact angle θo is 90°, with reference to FIG. 4, ratio between the belt tight side tension and the belt slack side tension needs to be less than approximately 2.2.

Herein, conditions for the belt not to slip at the electric rotating machine 13 at the time of driving the auxiliary machines by means of the engine are as follows, establishing that the tight side belt tension ⑤ of the electric rotating machine pulley 13 required at this time is To.

$$\frac{To}{To-300}<2.2$$

$$To>550 \qquad \text{Expression 6:}$$

It is understood from the above-mentioned expressions that the belt tight side tension To ⑤ with respect to the electric rotating machine pulley 13 at the time of driving the auxiliary machines by means of the engine needs to be larger than at least 550N.

Accordingly, a tight side belt tension ⑤ of the electric rotating machine pulley 13 at the time of driving the auxiliary machines by means of the engine, that is, the minimum necessary set tension value of the second auto-tensioner is to be 560N.

In the case where a plurality of auto-tensioners are provided in the belt drive system, an initial tension of the belt is converged at a value of the auto-tensioner of which set tension value is the largest among these plural auto-tensioners. Consequently, an initial tension in the case of this third prior art is to be 560N.

The following Table 1 shows comparison between each embodiment and each prior art in terms of the contents described above, especially in value of initial tension that is applied to the crank pulley and the pulley of each auxiliary machine at all times even when the engine is stopped, and determines the maximum tension value in the following table. It is understood from Table 1 that initial tension value is found lower in each embodiment according to this invention than in the prior arts.

TABLE 1

| | initial tension (N) |
|---|---|
| Embodiment 1 | 525 |
| Embodiment 2 | 525 |
| Embodiment 3 | 200 |
| First prior art | 1200 |
| Second prior art | 560 |
| Third prior art | 560 |

In addition, although the above-mentioned comparison is carried out under certain conditions, it can be generally said that initial tension of the embodiments 1 and 2 is lower than that of the first prior art, and that an initial tension of the embodiment 3 is lower than that of the third prior art under any load conditions as far as a contact angle of the belt wrapped around in the prior art is less than 130°.

Further, in the above-mentioned constitution according to this third embodiment, the belt drive system in which the mentioned contact angle can be varied by changing and adjusting position of the mentioned idle pulley 17*a* of the first stopper-equipped auto-tensioner 17 and position of the mentioned idle pulley 19*a* of the second stopper-equipped auto-tensioner 19.

In this constitution, since the mentioned contact angle can be varied by changing and adjusting position of the mentioned idle pulley 17*a* of the first stopper-equipped auto-tensioner 17 and position of the mentioned idle pulley 19*a* of the second stopper-equipped auto-tensioner 19, a contact angle can be adjusted suitably depending on load conditions, and an initial tension can be appropriately set as may be necessary.

This third embodiment includes constitutions described in the following paragraph (1) to (5), and achieves advantages respectively as described in each paragraph.

(1) A belt drive system including: an electric rotating machine operating as an electric motor or a generator; electric rotating machine switching control means for switching the mentioned electric rotating machine to the electric motor or to the generator; an electric rotating machine pulley that is mounted on a rotary shaft of the mentioned electric rotating machine; an auxiliary machine pulley that is connected to a rotary shaft of an auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which an idle pulley of a second stopper-equipped auto-tensioner is located on the side opposite to the crank pulley with respect to the mentioned electric rotating machine pulley so that contact angle of the belt wrapped around the mentioned electric rotating machine pulley in contact therewith may be in a range of not less than 130° and not more than 230°; an idle pulley of a first stopper-equipped auto-tensioner is located between the mentioned electric rotating machine pulley and the mentioned internal combustion engine crank pulley; and position of the mentioned idle pulley of the first stopper-equipped auto-tensioner is fixed and the mentioned idle pulley of the second stopper-equipped auto-tensioner comes to be movable at the time of starting the mentioned internal combustion engine by means of the mentioned electric rotating machine; while position of the mentioned idle pulley of the second stopper-equipped auto-tensioner being fixed, and the mentioned idle pulley of the first stopper-equipped auto-tensioner coming to be movable at the time of driving the mentioned electric rotating machine as a generator by means of the mentioned internal combustion engine.

This constitution brings about the following advantages.

That is, the idle pulley of a second stopper-equipped auto-tensioner is located on the belt slack side with respect to the electric rotating machine pulley, and contact angle of the belt wrapped around the electric rotating machine pulley is in the range of not less than 130° and not more than 230°. Therefore, slippage hardly occurs even if a tension ratio between the belt tight side and the slack side becomes large. Further, since the idle pulley of the first stopper-equipped auto-tensioner is located between the electric rotating machine pulley and the crank pulley, position of the mentioned idle pulley of the first stopper-equipped auto-tensioner is fixed, and the mentioned idle pulley of the second stopper-equipped auto-tensioner comes to be movable at the time of starting the engine. Furthermore, since position of the mentioned idle pulley of the second stopper-equipped auto-tensioner, which is on the belt tight side of the electric rotating machine pulley at the time of driving the auxiliary machines by means of the engine, is fixed and the mentioned first stopper-equipped auto-tensioner side comes to the belt slack side with respect to the crank pulley, the mentioned idle pulley moves and functions to keep a constant tension.

As a result, an initial tension is not set to be especially high both at the time of starting the engine and at the time of driving the auxiliary machines by means of the engine. Consequently, it is not necessary to increase durability of the shaft, bearing, and other support structure of the auxiliary machine. In this manner, an advantage is assured such that growing in size and/or increase in cost can be prevented.

(2) A belt drive system including: an electric rotating machine operating as an electric motor; an electric rotating machine pulley that is mounted on a rotary shaft of the mentioned electric rotating machine; an auxiliary machine pulley that is connected to a rotary shaft of an auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which an idle pulley of a second stopper-equipped auto-tensioner is located on the side opposite to the crank pulley with respect to the mentioned electric rotating machine pulley so that contact angle of the belt wrapped around the mentioned electric rotating machine pulley in contact therewith may be in a range of not less than 130° and not more than 230°; an idle pulley of a first stopper-equipped auto-tensioner is located between the mentioned electric rotating machine pulley and the mentioned internal combustion engine crank pulley; and position of the mentioned idle pulley of the first stopper-equipped auto-tensioner is fixed, and the mentioned idle pulley of the second stopper-equipped auto-tensioner comes to be movable at the time of starting the mentioned internal combustion engine by means of the mentioned electric rotating machine; while position of the mentioned idle pulley of the second stopper-equipped auto-tensioner being fixed and the mentioned idle pulley of the first stopper-equipped auto-tensioner coming to be movable at the time of driving the mentioned electric rotating machine and auxiliary machine by means of the mentioned internal combustion engine.

This constitution brings about the following advantages.

In the case of employing an electric rotating machine operating as an electric motor, the safe advantage as in the above-mentioned paragraph (1) is performed.

(3) A belt drive system including: an auxiliary machine-equipped electric rotating machine having an electric rotating machine function to operate as an electric motor or a generator and an auxiliary machine function to operate as an auxiliary machine by connecting an auxiliary machine element to a rotary shaft of the electric rotating machine which performs the mentioned electric rotating machine function; electric rotating machine switching control means for switching the mentioned electric rotating machine to the electric motor or to the generator; an electric rotating machine pulley mounted on the rotary shaft of the mentioned auxiliary machine-equipped electric rotating machine; an auxiliary machine pulley that is connected to a rotary shaft of the auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which an idle pulley of a second stopper-equipped auto-tensioner is located on the side opposite to the crank pulley with respect to the mentioned auxiliary machine-equipped electric rotating machine pulley so that contact angle of the belt that is wrapped around the mentioned auxiliary machine-equipped electric rotating machine pulley in contact therewith may be in a range of not less than 130° and not more than 230°; an idle pulley of a first stopper-equipped auto-tensioner is located between the mentioned auxiliary machine-equipped electric rotating machine pulley and the mentioned internal combustion engine crank pulley; and position of the mentioned idle pulley of the first stopper-equipped auto-tensioner is fixed, and the mentioned idle pulley of the second stopper-equipped auto-tensioner comes to be movable at the time of starting the mentioned internal combustion engine by means of the mentioned auxiliary machine-equipped electric rotating machine; while position of the mentioned idle pulley of the second stopper-equipped auto-tensioner being fixed and the mentioned idle pulley of the first stopper-equipped auto-tensioner coming to be movable at the time of driving the mentioned auxiliary machine-equipped electric rotating machine as a generator by means of the mentioned internal combustion engine.

This constitution brings about the following advantages.

In the case of employing the auxiliary machine-equipped electric rotating machine having both electric rotating machine function to operate as an electric motor or a generator and auxiliary machine function, the same advantage as in the above-mentioned paragraph (1) is performed.

(4) A belt drive system including: an auxiliary machine-equipped electric rotating machine having an electric rotating machine function to operate as an electric motor and an auxiliary machine function to operate as an auxiliary machine by connecting an auxiliary machine element to a rotary shaft of an electric rotating machine which performs the mentioned electric rotating machine function; an electric rotating machine pulley mounted on the rotary shaft of the mentioned auxiliary machine-equipped electric rotating machine; an auxiliary machine pulley that is connected to a rotary shaft of the auxiliary machine and transmits power to the auxiliary machine; an internal combustion engine crank pulley that is connected to a crankshaft of an internal combustion engine and transmits power in such a manner as being capable of performing input/output; and a belt continuously wrapped around the mentioned electric rotating machine pulley, the mentioned auxiliary machine pulley and the mentioned internal combustion engine crank pulley; in which an idle pulley of a second stopper-equipped auto-tensioner is located on the side opposite to the crank pulley with respect to the mentioned auxiliary machine-equipped electric rotating machine pulley so that contact angle of the belt that is wrapped around the mentioned auxiliary machine-equipped electric rotating machine pulley in contact therewith may be in a range of not less than 130° and not more than 230°; an idle pulley of a first stopper-equipped auto-tensioner is located between the mentioned auxiliary machine-equipped electric rotating machine pulley and the mentioned internal combustion engine crank pulley; and position of the mentioned idle pulley of the first stopper-equipped auto-tensioner is fixed, and the mentioned idle pulley of the second stopper-equipped auto-tensioner comes to be movable at the time of starting the mentioned internal combustion engine by means of the mentioned auxiliary machine-equipped electric rotating machine; while position of the mentioned idle pulley of the second stopper-equipped auto-tensioner being fixed and the mentioned idle pulley of the first stopper-equipped auto-tensioner coming to be movable at the time of driving the mentioned auxiliary machine-equipped electric rotating machine and auxiliary machine by means of the internal combustion engine.

This constitution brings about the following advantages.

In the case of employing the auxiliary machine-equipped electric rotating machine having both electric rotating machine function to operate as an electric motor and auxiliary machine function, the same advantage as in the above-mentioned paragraph (1) is performed.

(5) A belt drive system as defined in any of the constitutions of the foregoing paragraphs (1) to (4) of the foregoing first embodiment and this third embodiment, in which position of the mentioned stationary tension pulley, position of the mentioned idle pulley of the first stopper-equipped auto-tensioner and position of the mentioned idle pulley of the second stopper-equipped auto-tensioner are moved and adjusted thereby enabling the mentioned contact angle to change.

This constitution brings about the following advantages.

Since position of the mentioned stationary tension pulley, that of the mentioned idle pulley of the first stopper-equipped auto-tensioner and that of the mentioned idle pulley of the second stopper-equipped auto-tensioner are moved and adjusted, thereby enabling the mentioned contact angle to vary, the contact angle can be adjusted accordingly depending on load conditions, and an initial tension can be set appropriately as required.

Embodiment 4

Figure 10:
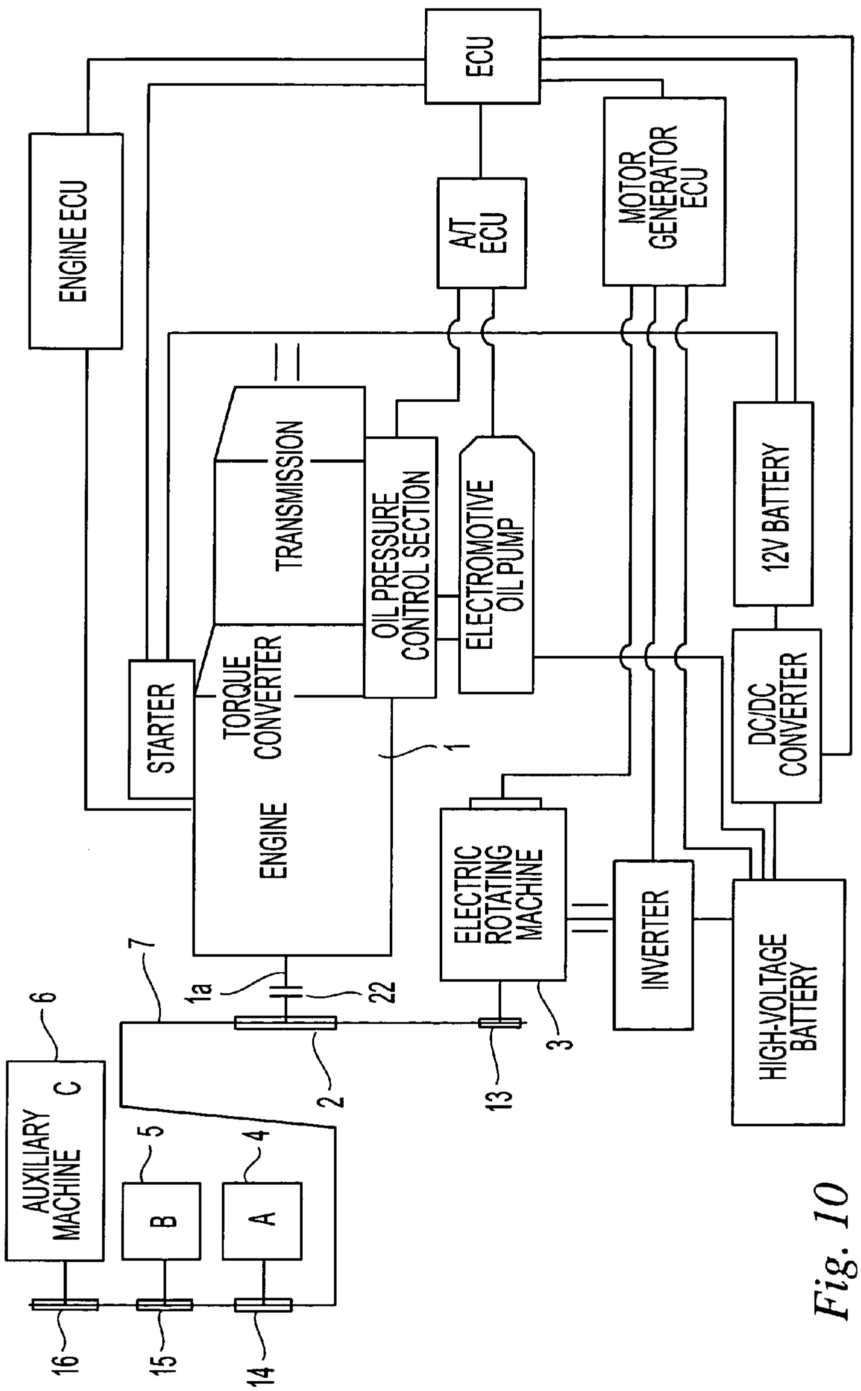
FIG. 10 is a block diagram showing a system constitution of peripheral devices of an engine including a belt drive system according to a fourth embodiment of the invention.

A fourth preferred embodiment according to the invention is described with reference to FIG. 10. FIG. 10 is a block diagram showing a system constitution of peripheral devices of an engine including a belt drive system according to the fourth embodiment.

In this fourth embodiment, constitutions other than specific ones described herein are the same as those in the foregoing first, second and third embodiments, and perform the same functions and advantages. In the drawings, like reference numerals are designated to the same or like parts.

In the drawings, reference numeral 1 designates an internal combustion engine, numeral 1*a* designates a crankshaft, numeral 2 designates a crank pulley, and numeral 3 designates an electric rotating machine. Numeral 4 designates an auxiliary machine A, numeral 5 designates an auxiliary machine B, numeral 6 designates an auxiliary machine C, and numeral 7 designates a belt. Numeral 13 designates an electric rotating machine pulley mounted on a rotary shaft of the electric rotating machine 3, and numerals 14, 15, 16 designate pulleys mounted on the auxiliary machine 4, the auxiliary machine 5, and the auxiliary machine 6 respectively. Numeral 22 designates a clutch.

The clutch 22 can switch power to be in transmission mode or to be in non-transmission mode between the crankshaft 1*a* of the engine 1 and the pulley 13 provided at the rotary shaft of the electric rotating machine 3.

Thus, power can be transmitted or interrupted from the engine 1 to the electric rotating machine 3, or from the electric rotating machine 3 to the engine 1, thereby enabling to control flow of the power efficiently.

This fourth embodiment includes a constitution shown in the following paragraph (1) and achieves an advantage described therein.

(1) A belt drive system as defined in the foregoing embodiments 1 to 3, in which a clutch capable of switching power to be in transmission mode or to be in non-transmission mode between a crankshaft of an engine and a rotary shaft of an electric rotating machine is provided.

This constitution brings about the following advantage.

Since a clutch capable of switching power to be in transmission mode or to be in non-transmission mode between a crankshaft of an engine and a rotary shaft of an electric rotating machine is provided, it is possible to transmit or interrupt the power from the engine to the electric rotating machine, or from the electric rotating machine to the engine. As a result, an advantage exits in that flow of power can be efficiently controlled.

Embodiment 5

Figure 11:
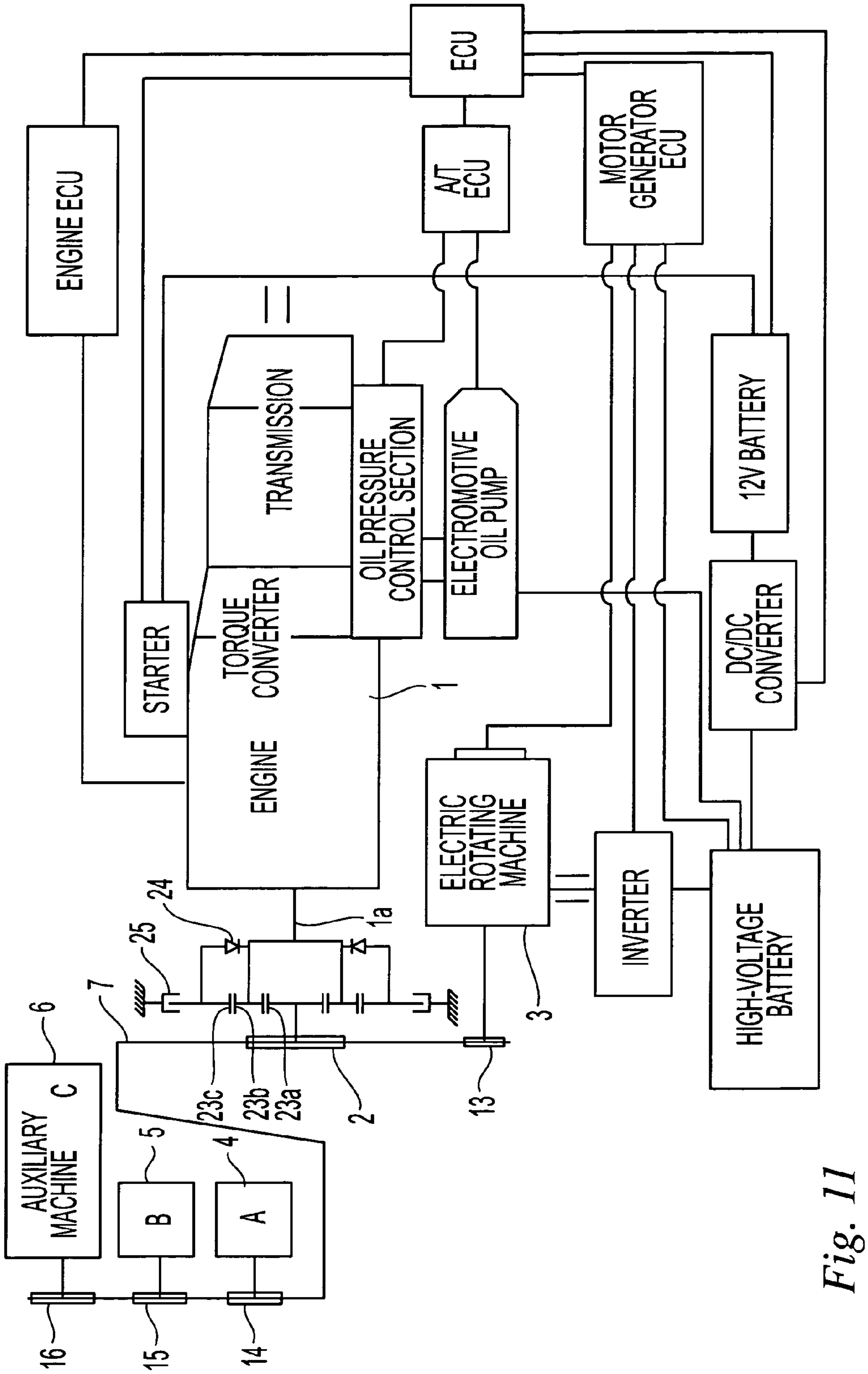
FIG. 11 is a block diagram showing a system constitution of peripheral devices of an engine including a belt drive system according to a fifth embodiment of the invention.

A fifth preferred embodiment according to the invention is described with reference to FIG. 11. FIG. 11 is a block diagram showing a system constitution of peripheral devices of an engine including a belt drive system according to the fifth embodiment.

In this fifth embodiment, constitutions other than specific ones described herein are the same as those in the foregoing first, second and third embodiments, and perform the same functions and advantages. In the drawings, like reference numerals are designated to the same or like parts.

In the drawings, reference numeral 1 designates an internal combustion engine, numeral 1*a* designates a crankshaft, numeral 2 designates a crank pulley, and numeral 3 designates an electric rotating machine. Numeral 4 designates an auxiliary machine A, numeral 5 designates an auxiliary machine B, numeral 6 designates an auxiliary machine C, and numeral 7 designates a belt. Numeral 13 designates an electric rotating machine pulley mounted on a rotary shaft of the electric rotating machine 3, and numerals 14, 15, 16 designate pulleys mounted on the auxiliary machine 4, the auxiliary machine 5, and the auxiliary machine 6 respectively. Numeral 23 designates a transmission, numeral 24 designates a one-way clutch, and numeral 25 designates a clutch.

The transmission 23 is provided with a sun gear 23*a*, a planetary gear 23*b*, and an internal gear 23*c*.

In this constitution, the clutch 25, the transmission 23 and the one-way clutch 24 are provided. These members 23, 24 and 25 are capable of switching power to be in transmission mode or to be in non-transmission mode, in a manner of bidirectionally increasing or decreasing speed, between the crankshaft 1*a* of the engine 1 and the pulley 13 provided at the rotary shaft of the electric rotating machine 3.

In this constitution, since the clutch 25, the transmission 23 and the one-way clutch 24 that are capable of switching power to be in transmission mode or to be in non-transmission mode, in a manner of bidirectionally increasing or decreasing speed, between the crankshaft 1*a* of the engine 1 and the pulley 13 provided at the rotary shaft of the electric rotating machine 3, it is possible to transmit power in a speed changing manner from the engine 1 to the electric rotating machine 3, or from the electric rotating machine 3 to the engine 1, or to interrupt power. Thus, flow of power can be efficiently controlled.

This fifth embodiment includes a constitution shown in the following paragraph (1), and achieves advantages described therein.

(1) A belt drive system including a clutch, a transmission and a one-way clutch that are capable of switching power to be in transmission mode or to be in non-transmission mode, in a manner of bidirectionally increasing or decreasing speed, between a crankshaft of an engine and a rotary shaft of an electric rotating machine.

This constitution brings about the following advantage.

There are provided the clutch, the transmission and the one-way clutch that are capable of switching power to be in transmission mode or to be in non-transmission mode, in a manner of bidirectionally increasing or decreasing speed, between the crankshaft of the engine and the rotary shaft of the electric rotating machine, and consequently it is possible to transmit power in a speed changing manner ed from the engine 1 to the electric rotating machine 3, or from the electric rotating machine 3 to the engine 1, or to interrupt power. Thus, flow of power can be efficiently controlled.

As described above, in the embodiments of the invention, advantages are assured such that growing in size and/or increase in cost accompanied by increasing durability of a shaft, bearing and other support structure of the auxiliary machine can be prevented, and furthermore duration of belt's life can be improved.

What is claimed is:

1. A belt drive system comprising:

an electric rotating machine operating as an electric motor, an electric rotating machine pulley that is mounted on a rotary shaft of said electric rotating machine;

an auxiliary machine pulley that is connected to a rotary shaft of an auxiliary machine and transmits power to the auxiliary machine;

an internal combustion engine crank pulley that is connected to a crankshaft of an internal combustion engine and transmits power in such a manner as being capable of performing input/output;

a stationary tension pulley is located on the side opposite to the crank pulley with respect to said electric rotating machine pulley, an idle pulley with a first stopper-equipped auto-tensioner is located between said electric rotating machine pulley and said internal combustion engine crank pulley;

a belt continuously wrapped around said electric rotating machine pulley, said stationary tension pulley, said auxiliary machine pulley, said internal combustion engine crank pulley and said idle pulley; and position of said idle pulley is fixed at the time of starting said internal combustion engine by means of said electric rotating machine, and is movable at the time of driving said electric rotating machine by means of said internal combustion engine by said auto-tensioner, wherein said stationary pulley and idle pulley are disposed on opposite sides each other with respect to said electric rotating machine pulley and provides a contact angle of the belt wrapped around said electric rotating machine pulley, and wherein said contact angle is in a range of not less than 130° and not more than 230°.

2. A belt drive system according to claim 1, wherein said electric rotating machine operating as an electric motor or a generator;

electric rotating machine switching control means for switching said electric rotating machine to the electric motor or to the generator.

3. A belt drive system according to claim 1, wherein position of said stationary tension pulley and position of said idle pulley of the first stopper-equipped auto-tensioner are moved and adjusted thereby enabling said contact angle to change.

4. A belt drive system according to claim 2, wherein position of said stationary tension pulley and position of said idle pulley of the first stopper-equipped auto-tensioner are moved and adjusted thereby enabling said contact angle to change.

5. A belt drive system comprising:

an electric rotating machine operating as an electric motor;

an electric rotating machine pulley that is mounted on a rotary shaft of said electric rotating machine;

an auxiliary machine pulley that is connected to a rotary shaft of the auxiliary machine and transmits power to the auxiliary machine;

an internal combustion engine crank pulley that is connected to a crankshaft of an internal combustion engine and transmits power in such a manner as being capable of performing input/output; and a belt continuously wrapped around said electric rotating machine pulley, said auxiliary machine pulley and said internal combustion engine crank pulley;

wherein said auxiliary machine pulley is located on the side opposite to the crank pulley with respect to said electric rotating machine pulley so that contact angle of the belt wrapped around said electric rotating machine pulley in contact therewith may be in a range of not less than 130° and not more than 230°;

an idle pulley of a first stopper-equipped auto-tensioner is located between said electric rotating machine pulley and said internal combustion engine crank pulley; and position of said idle pulley is fixed at the time of starting said internal combustion engine by means of said electric rotating machine, while said idle pulley coming to be movable at the time of driving said auxiliary machine by means of said internal combustion engine.

6. A belt drive system according to claim 5, wherein an electric rotating machine operating as an electric motor or a generator;

electric rotating machine switching control means for switching said electric rotating machine to the electric motor or to the generator.

7. A belt drive system comprising:

an electric rotating machine operating as an electric motor;

an electric rotating machine pulley that is mounted on a rotary shaft of said electric rotating machine;

an auxiliary machine pulley that is connected to a rotary shaft of an auxiliary machine and transmits power to the auxiliary machine;

an internal combustion engine crank pulley that is connected to a crankshaft of an internal combustion engine and transmits power in such a manner as being capable of performing input/output; and a belt continuously wrapped around said electric rotating machine pulley, said auxiliary machine pulley and said internal combustion engine crank pulley;

wherein an idle pulley of a second stopper-equipped auto-tensioner is located on the side opposite to the crank pulley with respect to said electric rotating machine pulley so that contact angle of the belt wrapped around said electric rotating machine pulley in contact therewith may be in a range of not less than 130° and not more than 230°;

an idle pulley of a first stopper-equipped auto-tensioner is located between said electric rotating machine pulley and said internal combustion engine crank pulley; and position of said idle pulley of the first stopper-equipped auto-tensioner is fixed, and said idle pulley of the second stopper-equipped auto-tensioner comes to be movable at the time of starting said internal combustion engine by means of said electric rotating machine; while position of said idle pulley of the second stopper-equipped auto-tensioner being fixed and said idle pulley of the first stopper-equipped auto-tensioner coming to be movable at the time of driving said auxiliary machine by means of said internal combustion engine.

8. A belt drive system according to claim 7, wherein an electric rotating machine operating as an electric motor or a generator;

electric rotating machine switching control means for switching said electric rotating machine to the electric motor or to the generator.

9. A belt drive system according to claim 7, wherein a position of said idle pulley of the first stopper-equipped auto-tensioner and a position of said idle pulley of the second stopper-equipped auto-tensioner are moved and adjusted thereby enabling said contact angle to change.

10. A belt drive system according to claim 8, wherein a position of said idle pulley of the first stopper-equipped auto-tensioner and a position of said idle pulley of the second stopper-equipped auto-tensioner are moved and adjusted thereby enabling said contact angle to change.

11. A belt drive system according to claim 1, further comprising a clutch capable of switching power to be in transmission mode or to be in non-transmission mode between a crankshaft of an engine and a rotary shaft of an electric rotating.

12. A belt drive system according to claim 5, further comprising a clutch capable of switching power to be in transmission mode or to be in non-transmission mode between a crankshaft of an engine and a rotary shaft of an electric rotating.

13. A belt drive system according to claim 7, further comprising a clutch capable of switching power to be in transmission mode or to be in non-transmission mode between a crankshaft of an engine and a rotary shaft of an electric rotating machine.

14. A belt drive system according to claim 1, further comprising a transmission and a one-way clutch that are capable of switching power to be in transmission mode or to be in non-transmission mode, in a manner of bidirectionally increasing or decreasing speed, between a crankshaft of an engine and a rotary shaft of an electric rotating machine.

15. A belt drive system according to claim 5, further comprising a transmission and a one-way clutch that are capable of switching power to be in transmission mode or to be in non-transmission mode, in a manner of bidirectionally increasing or decreasing speed, between a crankshaft of an engine and a rotary shaft of an electric rotating machine.

16. A belt drive system according to claim 7, further comprising a transmission and a one-way clutch that are capable of switching power to be in transmission mode or to be in non-transmission mode, in a manner of bidirectionally increasing or decreasing speed, between a crankshaft of an engine and a rotary shaft of an electric rotating machine.

17. A belt drive system comprising:

an electric rotating machine pulley that is mounted on a rotary shaft of an electric rotating machine;

an auxiliary machine pulley that is connected to a rotary shaft of an auxiliary machine and transmits power to the auxiliary machine; and an internal combustion engine crank pulley that is connected to a crankshaft of an internal combustion engine and transmits power in such a manner as being capable of performing input/output, wherein a stationary tension pulley is located on the side opposite to the crank pulley with respect to said electric rotating machine pulley, so that a contact angle of a belt wrapped around said electric rotating machine pulley is in a range of not less than 130° and not more than 230°.

18. A belt drive system comprising:

an electric rotating machine pulley that is mounted on a rotary shaft of an electric rotating machine;

an auxiliary machine pulley that is connected to a rotary shaft of the auxiliary machine and transmits power to the auxiliary machine; and an internal combustion engine crank pulley that is connected to a crankshaft of an internal combustion engine and transmits power in such a manner as being capable of performing input/output, wherein said auxiliary machine pulley is located on the side opposite to the crank pulley with respect to said electric rotating machine pulley, so that a contact angle of a belt wrapped around said electric rotating machine pulley is in a range of not less than 130° and not more than 230°.

19. A belt drive system comprising:

an electric rotating machine pulley that is mounted on a rotary shaft of an electric rotating machine;

an auxiliary machine pulley that is connected to a rotary shaft of an auxiliary machine and transmits power to the auxiliary machine; and an internal combustion engine crank pulley that is connected to a crankshaft of an internal combustion engine and transmits power in such a manner as being capable of performing input/output;

wherein an idle pulley of a stopper-equipped auto-tensioner is located on the side opposite to the crank pulley with respect to said electric rotating machine pulley, so that a contact angle of a belt wrapped around said electric rotating machine pulley is in a range of not less than 130° and not more than 230°.

* * * * *